US012518136B2

(12) United States Patent
Nishimura

(10) Patent No.: US 12,518,136 B2
(45) Date of Patent: Jan. 6, 2026

(54) INFERENCE EXECUTION METHOD FOR CANDIDATE NEURAL NETWORKS AND SWITCHING NEURAL NETWORKS

(71) Applicant: Panasonic Intellectual Property Management Co., Ltd., Osaka (JP)

(72) Inventor: Takashi Nishimura, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 995 days.

(21) Appl. No.: 17/675,582

(22) Filed: Feb. 18, 2022

(65) Prior Publication Data
US 2022/0172027 A1 Jun. 2, 2022

Related U.S. Application Data

(63) Continuation of application No. PCT/JP2021/000756, filed on Jan. 13, 2021.

(30) Foreign Application Priority Data

Mar. 27, 2020 (JP) ................................. 2020-058978

(51) Int. Cl.
*G06N 3/045* (2023.01)
*G06N 3/08* (2023.01)
(52) U.S. Cl.
CPC ............... *G06N 3/045* (2023.01); *G06N 3/08* (2013.01)
(58) Field of Classification Search
CPC .......... G06N 3/045; G06N 3/08; G06N 3/063; G06N 3/0464; G06N 3/0495; G06N 3/09
See application file for complete search history.

(56) References Cited

U.S. PATENT DOCUMENTS 5,619,619 A 4/1997 Shinohara et al.
10,931,813 B1 * 2/2021 Kim ...................... G01P 15/16
(Continued)

FOREIGN PATENT DOCUMENTS

JP H06-266688 A 9/1994
JP 2016-191966 A 11/2016
(Continued)

OTHER PUBLICATIONS

K. Chen, L. Yang, X. Yu, and H. Chi, A Self-Generating Modular Neural Network Architecture for Supervised Learning, Neurocomputing 16: 33-48, 1997. (Year: 1997).*
(Continued)

*Primary Examiner* — Jennifer N Welch
*Assistant Examiner* — Jake Timothy Breen
(74) *Attorney, Agent, or Firm* — GREENBLUM & BERNSTEIN, P.L.C.

(57) ABSTRACT

An inference execution method includes: selecting an inference neural network from among a plurality of inference neural network candidates generated from one training neural network that has been trained; sequentially obtaining data; sequentially executing, on the data sequentially obtained, inference using the inference neural network; sequentially outputting results of the inference sequentially executed; and selecting a new inference neural network from among the plurality of inference neural network candidates and switching the inference neural network to be used in the execution of the inference to the new inference neural network during an inference execution period in which the data is sequentially obtained, the inference is sequentially executed, and the results of the inference are sequentially output.

18 Claims, 18 Drawing Sheets

(56) References Cited

U.S. PATENT DOCUMENTS

| | | | |
|---|---|---|---|
| 11,379,260 B2* | 7/2022 | Natarajan | G06F 9/485 |
| 11,531,350 B2* | 12/2022 | Morita | G06N 3/08 |
| 11,640,533 B2* | 5/2023 | Whatmough | G06N 3/082 |
| | | | 706/25 |
| 2014/0279745 A1* | 9/2014 | Esponda | G06N 5/043 |
| | | | 706/12 |
| 2018/0167620 A1* | 6/2018 | Li | H04N 21/23439 |
| 2019/0042948 A1 | 2/2019 | Lee et al. | |
| 2019/0044825 A1* | 2/2019 | Vijayakumar | H04L 41/14 |
| 2019/0057308 A1* | 2/2019 | Cho | G06N 3/082 |
| 2019/0197408 A1* | 6/2019 | Kibune | G06N 3/063 |
| 2020/0050942 A1* | 2/2020 | Sun | G06N 3/044 |
| 2020/0143232 A1 | 5/2020 | Ito | |

FOREIGN PATENT DOCUMENTS

| | | |
|---|---|---|
| JP | 2019-032833 A | 2/2019 |
| JP | 6528893 B1 | 6/2019 |

OTHER PUBLICATIONS

T. Bender, V. S. Gordon and M. Daniels, "Partitioning strategies for modular neural networks," 2009 International Joint Conference on Neural Networks, Atlanta, GA, USA, 2009, pp. 296-301, doi: 10.1109/IJCNN.2009.5178676. (Year: 2009).*

Emad MalekHosseini et al., Splitting Convolutional Neural Network Structures for Efficient Inference, published Feb. 9, 2020, arXiv:2002.03302 (Year: 2020).*

International Search Report (including English Language Translation), mailed Apr. 13, 2021 by the Japan Patent Office (JPO), in International Application No. PCT/JP2021/000756.

Japanese Office Action (including English Language Translation), mailed Apr. 4, 2023, by the Japan Patent Office (JPO) for Japanese Patent Application No. 2020-058978.

* cited by examiner

INFERENCE EXECUTION METHOD FOR CANDIDATE NEURAL NETWORKS AND SWITCHING NEURAL NETWORKS

CROSS REFERENCE TO RELATED APPLICATIONS

This is a continuation application of PCT International Application No. PCT/JP2021/000756 filed on Jan. 13, 2021, designating the United States of America, which is based on and claims priority of Japanese Patent Application No. 2020-058978 filed on Mar. 27, 2020.

FIELD

The present disclosure relates to an inference execution method, etc., in which inference is executed on data using an inference neural network.

BACKGROUND

Conventionally, a training program in which pre-training for a neural network is redefined on the basis of statistical data of fixed-point arithmetic operation has been proposed (refer to Patent Literature (PTL) 1).

CITATION LIST

Patent Literature

PTL 1: Japanese Patent No. 6528893

SUMMARY

However, the technique disclosed in PTL 1 mentioned above can be improved upon.

In view of this, the present disclosure provides an inference execution method, etc., capable of improving upon the above related art.

An inference execution method according to one aspect of the present disclosure is an inference execution method for at least one information processing circuit to execute inference on data using an inference neural network. The inference execution method includes: selecting the inference neural network from among a plurality of inference neural network candidates generated from one training neural network that has been trained; sequentially obtaining the data; sequentially executing, on the data sequentially obtained, the inference using the inference neural network; sequentially outputting results of the inference sequentially executed; and selecting a new inference neural network from among the plurality of inference neural network candidates and switching the inference neural network to be used in the execution of the inference to the new inference neural network during an inference execution period in which the data is sequentially obtained, the inference is sequentially executed, and the results of the inference are sequentially output.

Note that these general and specific aspects may be implemented using a system, a device, a method, an integrated circuit, a computer program, or a non-transitory computer-readable recording medium such as a compact disc read-only memory (CD-ROM), or any combination of systems, devices, methods, integrated circuits, computer programs, and recording media.

With the inference execution method according to one aspect of the present disclosure, it is possible to improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

For example, the use of a convolutional neural network (CNN) in high-resolution image recognition is drawing attention. A neural network (NN) such as the convolutional neural network, which is a mathematical model of simulated biological neurons, is also called a neural network model. The operation phases of the neural network include a training phase and an inference phase.

In the training phase, the neural network is trained using training data. Specifically, parameters of the neural network are adjusted so that the neural network outputs correct data in response to the training data input to the neural network. In the inference phase, actual data is input to the trained neural network, and the neural network outputs the result of inference executed on the actual data.

In the training phase, the parameters of the neural network are adjusted using a large amount of training data. Therefore, the amount of computation in the training phase is large. Thus, a high-performance device often performs the operation in the training phase. In contrast, the amount of computation in the inference phase is small compared to the amount of computation in the training phase. Furthermore, it may be difficult to prepare a high-performance device in an environment in which actual data is used. Thus, a low-performance device often performs the operation in the inference phase.

More specifically, a high-performance, general-purpose computer often performs the operation in the training phase, and a low-performance, embedded device often performs the operation in the inference phase. Therefore, the numerical format of the neural network that is used in the training phase and the numerical format of the neural network that is used in the inference phase are often different from each other.

Specifically, 32-bit floating points (fp32 bits) are used in the training phase, and 8-bit integers (int8 bits) are used in the inference phase. In other words, in the training phase, numerical values used in the neural network, for example, the data values (specifically, the values of input data, intermediate data, output data, and the like) and the parameters of the neural network, are expressed in 32-bit floating points. In the inference phase, numerical values used in the neural network are expressed in 8-bit integers.

For example, a fp32-bit neural network is obtained using a general-purpose computer. Furthermore, the fp32-bit neural network is converted into an int8-bit neural network so as to be usable in an embedded device. This allows a low-performance, embedded device to perform the operation in the inference phase according to the result of the training carried out by a high-performance, general-purpose computer.

Figure 1:
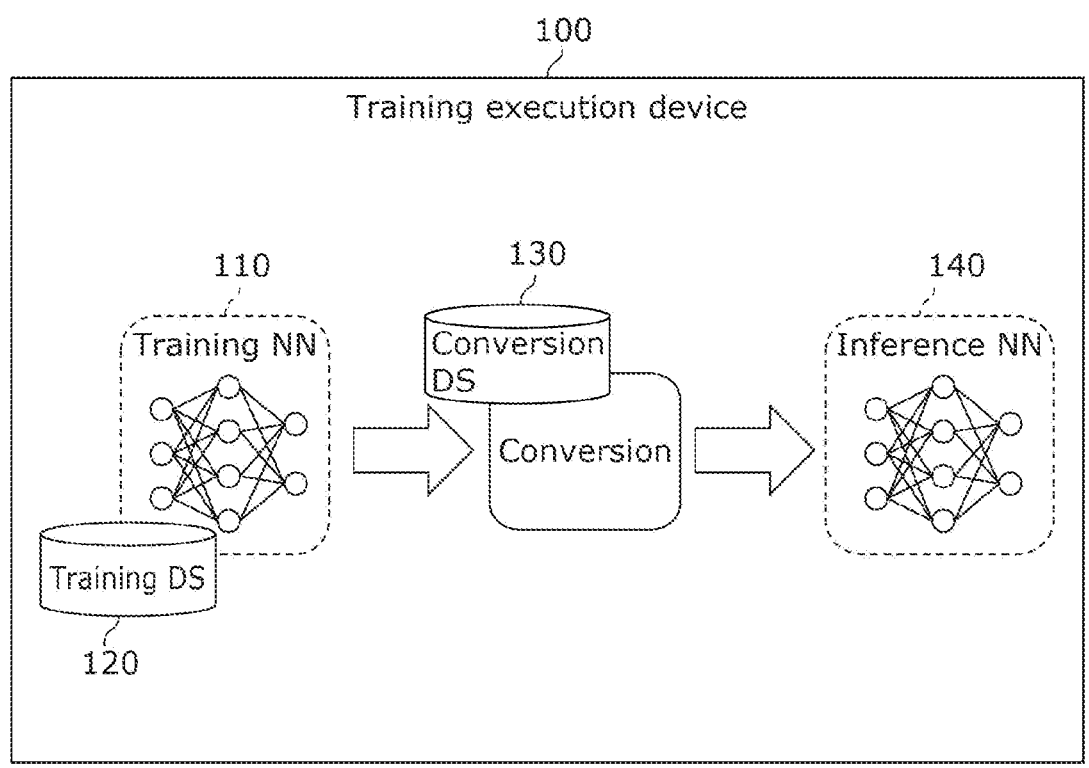
FIG. 1 is a conceptual diagram illustrating the operation of a training execution device according to a reference example.

FIG. 1 is a conceptual diagram illustrating the operation of a training execution device according to a reference example. In the example illustrated in FIG. 1, training execution device 100 trains training neural network 110 (training NN 110) using training dataset 120 (training DS 120). For example, training execution device 100 is a high-performance, general-purpose computer, and training neural network 110 is a fp32-bit CNN.

Next, training execution device 100 generates inference neural network 140 by converting trained training neural network 110 into inference neural network 140 (inference NN 140). For example, inference neural network 140 is an int8-bit CNN. In the conversion, training execution device 100 may use conversion dataset 130 (conversion DS 130). Conversion dataset 130 may be a subset of training dataset 120.

For example, training execution device 100 inputs conversion dataset 130 to training neural network 110. Furthermore, training execution device 100 adjusts a parameter set of training neural network 110 so that data values in training neural network 110 are expressed in int8 bits as appropriately as possible. Thus, training execution device 100 converts training neural network 110 and generates inference neural network 140.

Generated inference neural network 140 is introduced into an embedded device or the like and then used for inference.

Figure 2A:
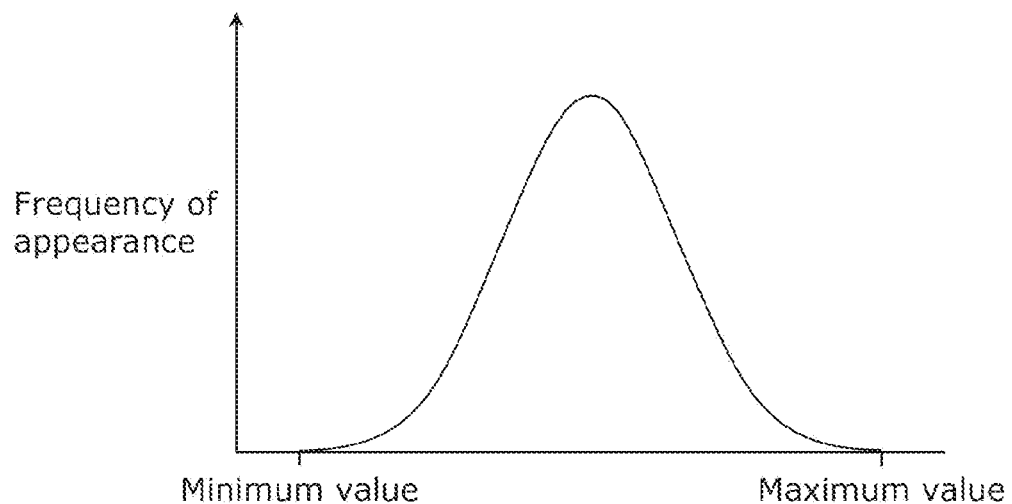
FIG. 2A is a graph illustrating the distribution of data values in a training phase.

FIG. 2A is a graph illustrating the distribution of data values in the training phase. For example, the data values in the training phase are expressed in fp32 bits in a general-purpose computer. Therefore, the data values in the training phase are finely divided and expressed between the minimum value and the maximum value.

Figure 2B:
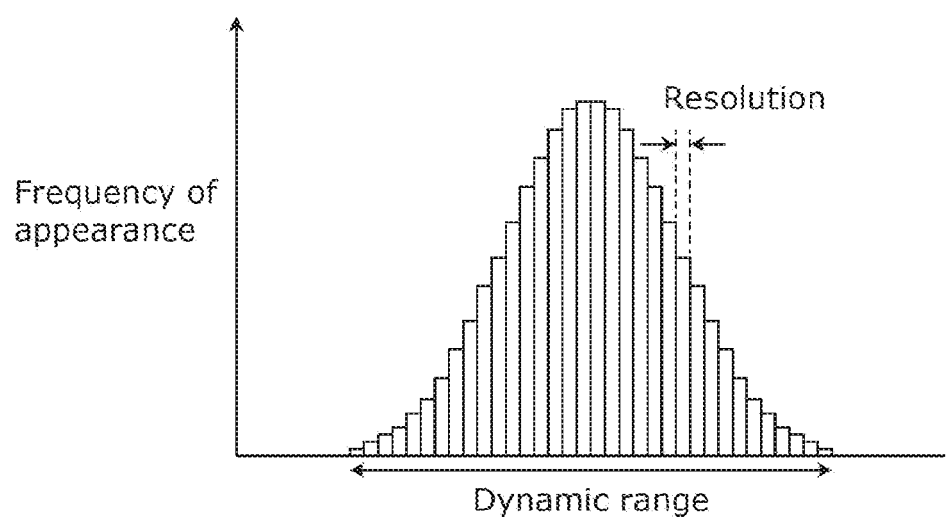
FIG. 2B is a graph illustrating the distribution of data values in an inference phase.

FIG. 2B is a graph illustrating the distribution of data values in the inference phase. For example, the data values in the inference phase are expressed in int8 bits in an embedded device. Therefore, the data values in the inference phase are less finely divided and expressed than the data values in the training phase. Expression of the data values in the inference phase depends on how to set the dynamic range (D range) and the resolution in numerical value format conversion.

The dynamic range corresponds to the range between the minimum and maximum values of expression, that is, the range of values that can be expressed. The resolution corresponds to a unit of measurement that can be expressed, that is, how finely the measurement is divided to be expressed. The number of values that can be expressed in int8 bits is less than the number of values that can be expressed in fp32 bits. Therefore, for example, training execution device 100 illustrated in FIG. 1 narrows the dynamic range or reduces the resolution in the conversion of training neural network 110. Here, there is a trade-off between the dynamic range and the resolution.

Specifically, when the resolution increases, the dynamic range is narrowed. On the other hand, when the dynamic range is widened, the resolution is reduced.

Figure 3A:
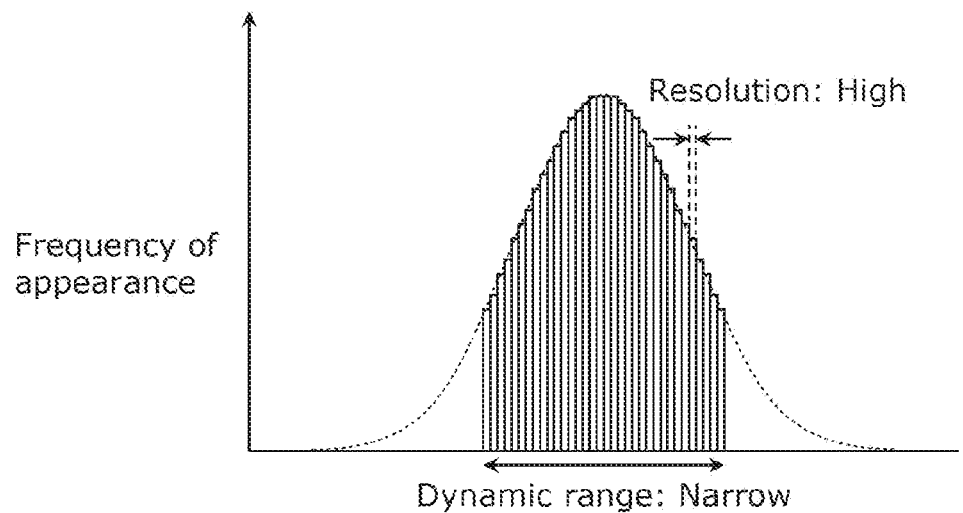
FIG. 3A is a graph illustrating the distribution of data values with a narrow dynamic range and high resolution.

FIG. 3A is a graph illustrating the distribution of data values with a narrow dynamic range and high resolution. In this example, since the resolution is high, the dynamic range is narrow. Thus, the dynamic range is saturated. Furthermore, if a value greater than the maximum value of expression or a value less than the minimum value of expression appears, the accuracy of the data values decreases, and the inference accuracy decreases.

Figure 3B:
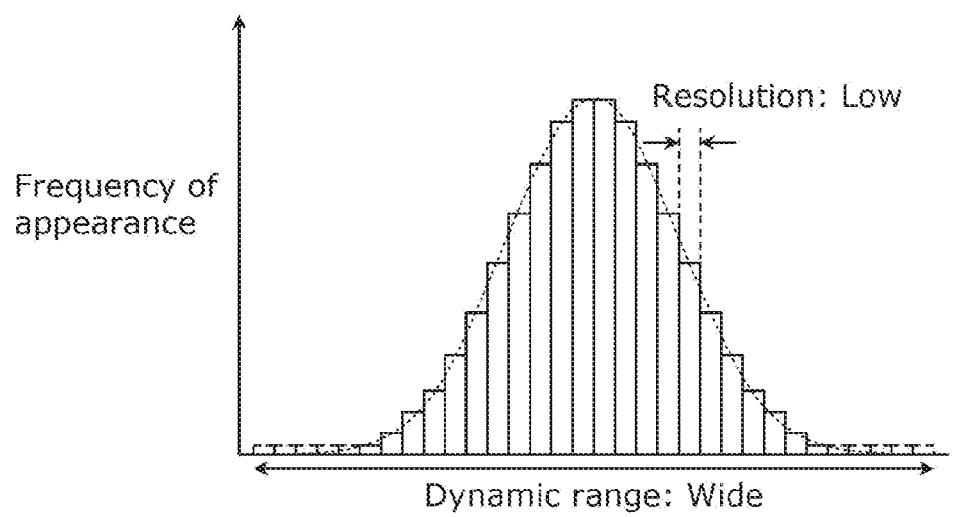
FIG. 3B is a graph illustrating the distribution of data values with a wide dynamic range and low resolution.

FIG. 3B is a graph illustrating the distribution of data values with a wide dynamic range and low resolution. In this example, since the dynamic range is wide, the resolution is low. Therefore, the accuracy of the data values decreases, and the inference accuracy decreases.

Figure 4:
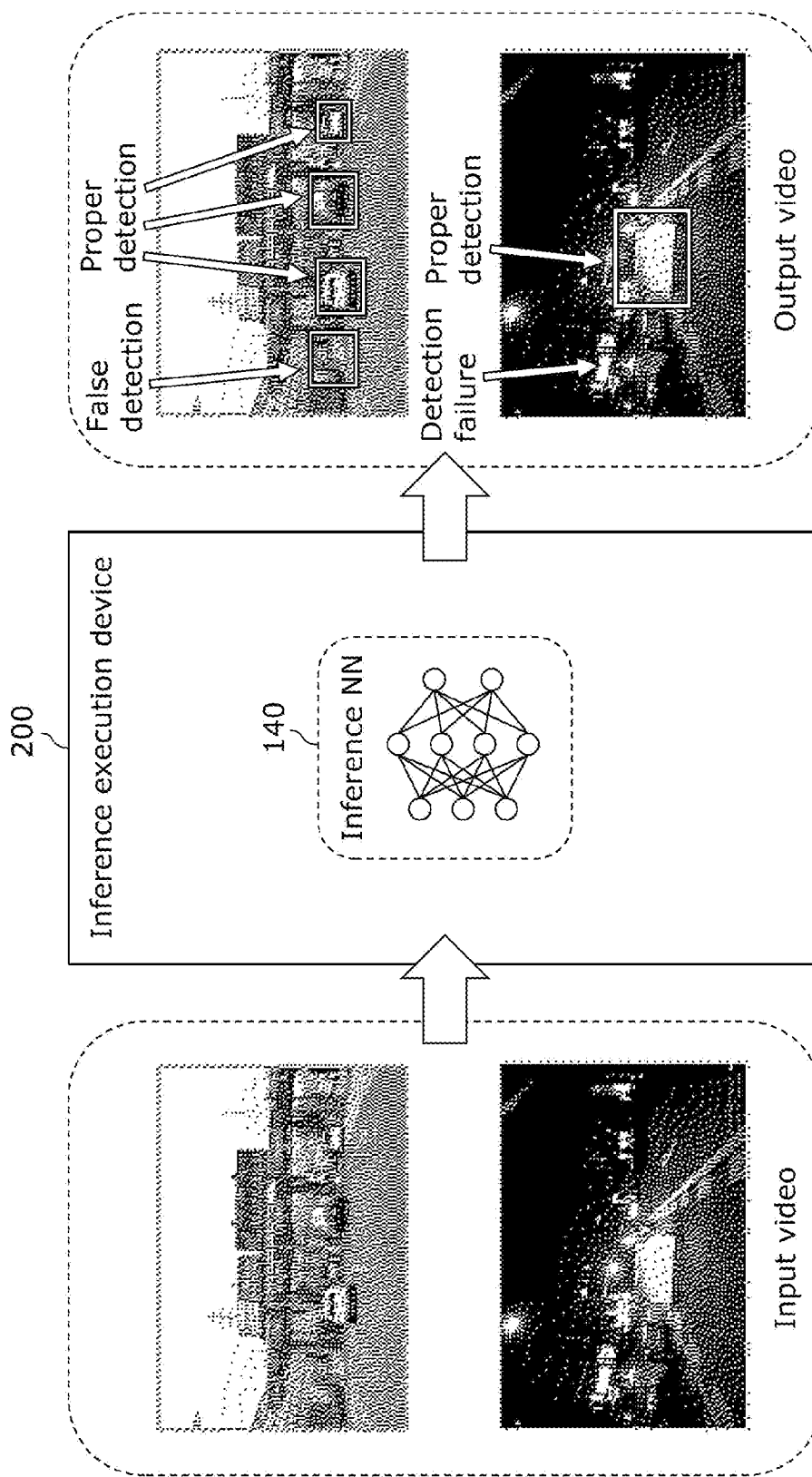
FIG. 4 is a conceptual diagram illustrating the operation of an inference execution device according to a reference example.

FIG. 4 is a conceptual diagram illustrating the operation of an inference execution device according to the reference example. In the example illustrated in FIG. 4, inference execution device 200 executes inference for detecting a vehicle on input video using inference neural network 140, and outputs, as the result of the inference, video in which the detected vehicle is enclosed by a detection frame. The output video illustrated in FIG. 4 is an example of the video output by inference execution device 200.

For example, inference execution device 200 is a low-performance, embedded device, and inference neural network 140 is the int8-bit CNN generated from the fp32-bit CNN by training execution device 100 illustrated in FIG. 1. As mentioned above, in the int8-bit CNN, the number of values that can be expressed is smaller than in the fp32-bit CNN, and thus the inference accuracy is likely to decrease.

Accordingly, there is a high likelihood of false detection and detection failures, as in the example illustrated in FIG. 4.

Furthermore, even when training execution device 100 illustrated in FIG. 1 generates inference neural network 140 using conversion dataset 130, an inference program having the dynamic range and the resolution that have been determined using the data pattern of conversion dataset 130 may not be appropriate for some sensor input. Therefore, there is a possibility of a decrease in accuracy in a portion of the sensor input.

Furthermore, PTL 1 described above indicates that the decimal point position is determined in the training phase. However, as mentioned above, in the inference phase in which a low-performance, embedded device or the like executes the inference, there are cases where a numerical format in which the number of values that can be expressed is less than that in the training phase in which a high-performance, general-purpose computer executes the training is used. Therefore, there is a possibility of a decrease in accuracy.

Thus, an inference execution method according to one aspect of the present disclosure is an inference execution method for at least one information processing circuit to execute inference on data using an inference neural network. The inference execution method includes: selecting the inference neural network from among a plurality of inference neural network candidates generated from one training neural network that has been trained; sequentially obtaining the data; sequentially executing, on the data sequentially obtained, the inference using the inference neural network; sequentially outputting results of the inference sequentially executed; and selecting a new inference neural network from among the plurality of inference neural network candidates and switching the inference neural network to be used in the execution of the inference to the new inference neural network during an inference execution period in which the data is sequentially obtained, the inference is sequentially executed, and the results of the inference are sequentially output.

With this, in the inference phase, it may become possible to adaptively apply an inference neural network among the plurality of inference neural network candidates. Therefore, it may become possible to minimize the decrease in accuracy in the inference phase.

For example, the plurality of inference neural network candidates have different dynamic ranges and different levels of resolution.

With this, it may become possible to adaptively apply an inference neural network among the plurality of inference neural network candidates that have different dynamic ranges and different levels of resolution. Therefore, it may become possible to minimize the decrease in accuracy in the inference phase.

Furthermore, for example, the plurality of inference neural network candidates correspond respectively to a plurality of environment state candidates that are a plurality of candidates of an environment state in which the data is obtained by sensing.

With this, it may become possible to adaptively apply an inference neural network among the plurality of inference neural network candidates that correspond respectively to the plurality of environment state candidates. Therefore, it may become possible to minimize the decrease in accuracy in the inference phase.

Furthermore, for example, the environment state includes an attribute related to a location, an illuminance level, or a time slot.

With this, it may become possible to adaptively apply an inference neural network among the plurality of inference neural network candidates that correspond respectively to a plurality of locations, a plurality of illuminance levels, or a plurality of time slots. Therefore, it may become possible to minimize the decrease in accuracy in the inference phase.

Furthermore, for example, during the inference execution period, each of one or more inference neural network candidates among the plurality of inference neural network candidates is evaluated using the data, and the new inference neural network is selected from among the one or more inference neural network candidates according to an evaluation result.

With this, it may become possible to properly select an inference neural network from among the plurality of inference neural network candidates according to the evaluation result. Therefore, it may become possible to minimize the decrease in accuracy in the inference phase.

Furthermore, for example, during the inference execution period, a neural network having highest resolution among one or more inference neural network candidates each having a dynamic range including, in an allowable range, a data value used in the inference is selected from among the plurality of inference neural network candidates as the new inference neural network.

With this, it may become possible to select, from among the plurality of inference neural network candidates, an inference neural network in which the data value can be properly expressed. Therefore, it may become possible to minimize the decrease in accuracy in the inference phase.

Furthermore, for example, the inference execution method further includes: obtaining the environment state from a measuring instrument that measures the environment state, and during the inference execution period, a neural network corresponding to the environment state is selected as the new inference neural network according to the environment state from among the plurality of inference neural network candidates that correspond respectively to the plurality of environment state candidates.

With this, it may become possible to properly select an inference neural network from among the plurality of inference neural network candidates according to the environment state. Therefore, it may become possible to minimize the decrease in accuracy in the inference phase.

Furthermore, for example, during the inference execution period, whether accuracy of the inference is decreasing is determined, and when the accuracy is determined to be decreasing, the new inference neural network is selected, and the inference neural network is switched to the new inference neural network.

With this, it may become possible to properly switch the inference neural network to a new inference neural network according to the decrease in inference accuracy. Therefore, it may become possible to minimize the decrease in accuracy in the inference phase.

Furthermore, for example, whether the accuracy is decreasing is determined according to at least one of a data value used in the inference or a likelihood related to the results of the inference during the inference execution period.

With this, it may become possible to properly determine, according to the data value or the likelihood, whether the accuracy is decreasing. Therefore, it may become possible to properly switch the inference neural network to a new inference neural network according to the decrease in inference accuracy.

Furthermore, for example, when the data value is outside a first range, the accuracy is determined to be decreasing.

With this, when the data value exceeds the range of the dynamic range or the like, it may become possible to properly determine that the accuracy is decreasing. Therefore, it may become possible to properly switch the inference neural network to a new inference neural network according to the decrease in inference accuracy.

Furthermore, for example, the inference execution method further includes: predicting the data value; and determining that the accuracy is decreasing when the data value predicted is outside a second range.

With this, when the predicted data value exceeds the range of the dynamic range or the like, it may become possible to properly determine that the accuracy is decreasing. Therefore, it may become possible to properly switch the inference neural network to a new inference neural network according to the decrease in inference accuracy.

Furthermore, for example, when the data value continuously remains within a third range throughout a first segment of the data, the accuracy is determined to be decreasing.

With this, when the dynamic range is wide and the data value is continuously included in the range, it may become possible to properly determine that the accuracy is decreasing. Therefore, it may become possible to properly switch the inference neural network to a new inference neural network according to the decrease in inference accuracy.

Furthermore, for example, when the likelihood continuously remains lower than a reference throughout a second segment of the data, the accuracy is determined to be decreasing.

With this, it may become possible to properly determine that the accuracy is decreasing when the failure to obtain an appropriate likelihood continues. Therefore, it may become possible to properly switch the inference neural network to a new inference neural network according to the decrease in inference accuracy.

Furthermore, for example, periodically, during the inference execution period, the new inference neural network is selected, and the inference neural network is switched to the new inference neural network.

With this, it may become possible to periodically switch the inference neural network to a new inference neural network. Therefore, it may become possible to minimize the decrease in accuracy in the inference phase.

Furthermore, for example, the inference execution method further includes: obtaining an environment state in which the data is obtained by sensing from a measuring instrument that measures the environment state, and during the inference execution period, when the environment state changes, the new inference neural network is selected, and the inference neural network is switched to the new inference neural network.

With this, it may become possible to switch the inference neural network to a new inference neural network according to a change in the environment state. Therefore, it may become possible to minimize the decrease in accuracy in the inference phase.

Furthermore, for example, the inference execution method further includes: generating the plurality of inference neural network candidates from the one training neural network.

With this, it may become possible to properly obtain a plurality of inference neural network candidates from one training neural network that has been trained. Therefore, it may become possible to adaptively apply an inference neural network among the plurality of inference neural network candidates, and it may become possible to minimize the decrease in accuracy in the inference phase.

Furthermore, for example, the inference execution method further includes: obtaining a plurality of datasets, and the plurality of inference neural network candidates that correspond respectively to the plurality of datasets are generated from the one training neural network according to the plurality of datasets.

With this, it may become possible to properly generate a plurality of inference neural network candidates according to the plurality of datasets. Therefore, it may become possible to adaptively apply an inference neural network among the plurality of inference neural network candidates that have been properly generated, and it may become possible to minimize the decrease in accuracy in the inference phase.

Furthermore, a non-transitory computer-readable recording medium according to one aspect of the present disclosure has a program recorded thereon for causing at least one information processing circuit to perform an inference execution method for the at least one information processing circuit to execute inference on data using an inference neural network. The inference execution method includes: selecting the inference neural network from among a plurality of inference neural network candidates generated from one training neural network that has been trained; sequentially obtaining the data; sequentially executing, on the data sequentially obtained, the inference using the inference neural network; sequentially outputting results of the inference sequentially executed; and selecting a new inference neural network from among the plurality of inference neural network candidates and switching the inference neural network to be used in the execution of the inference to the new inference neural network during an inference execution period in which the data is sequentially obtained, the inference is sequentially executed, and the results of the inference are sequentially output.

With this, it may become possible to adaptively apply an inference neural network among the plurality of inference neural network candidates according to the program. Therefore, the program may make it possible to minimize the decrease in accuracy in the inference phase.

Furthermore, a non-transitory computer-readable recording medium according to one aspect of the present disclosure has an inference execution model recorded thereon. The inference execution model includes a program for causing at least one information processing circuit to perform an inference execution method for the at least one information processing circuit to execute inference on data using an inference neural network. The inference execution method includes: selecting the inference neural network from among a plurality of inference neural network candidates generated from one training neural network that has been trained; sequentially obtaining the data; sequentially executing, on the data sequentially obtained, the inference using the inference neural network; sequentially outputting results of the inference sequentially executed; and selecting a new inference neural network from among the plurality of inference neural network candidates and switching the inference neural network to be used in the execution of the inference to the new inference neural network during an inference execution period in which the data is sequentially obtained, the inference is sequentially executed, and the results of the inference are sequentially output. The inference execution model further includes the one training neural network that has been trained or the plurality of inference neural network candidates generated from the one training neural network.

With this, it may become possible to adaptively apply an inference neural network among the plurality of inference neural network candidates according to the inference execution model. Therefore, the inference execution model may make it possible to minimize the decrease in accuracy in the inference phase.

Furthermore, these general and specific aspects may be implemented using a system, a device, a method, an integrated circuit, a computer program, or a non-transitory computer-readable recording medium such as a compact disc read-only memory (CD-ROM), or any combination of systems, devices, methods, integrated circuits, computer programs, and recording media.

Hereinafter, an embodiment will be described with reference to the drawings. Note that each embodiment described below shows a general or specific example. Therefore, the numerical values, shapes, materials, structural elements, the arrangement and connection of the structural elements, steps, the processing order of the steps etc., shown in the following embodiment are mere examples, and are not intended to limit the scope of the appended Claims. Therefore, among the structural elements in the following embodiment, structural elements not recited in any one of the independent claims which indicate the broadest concepts will be described as arbitrary structural elements.

Embodiment

Figure 5:
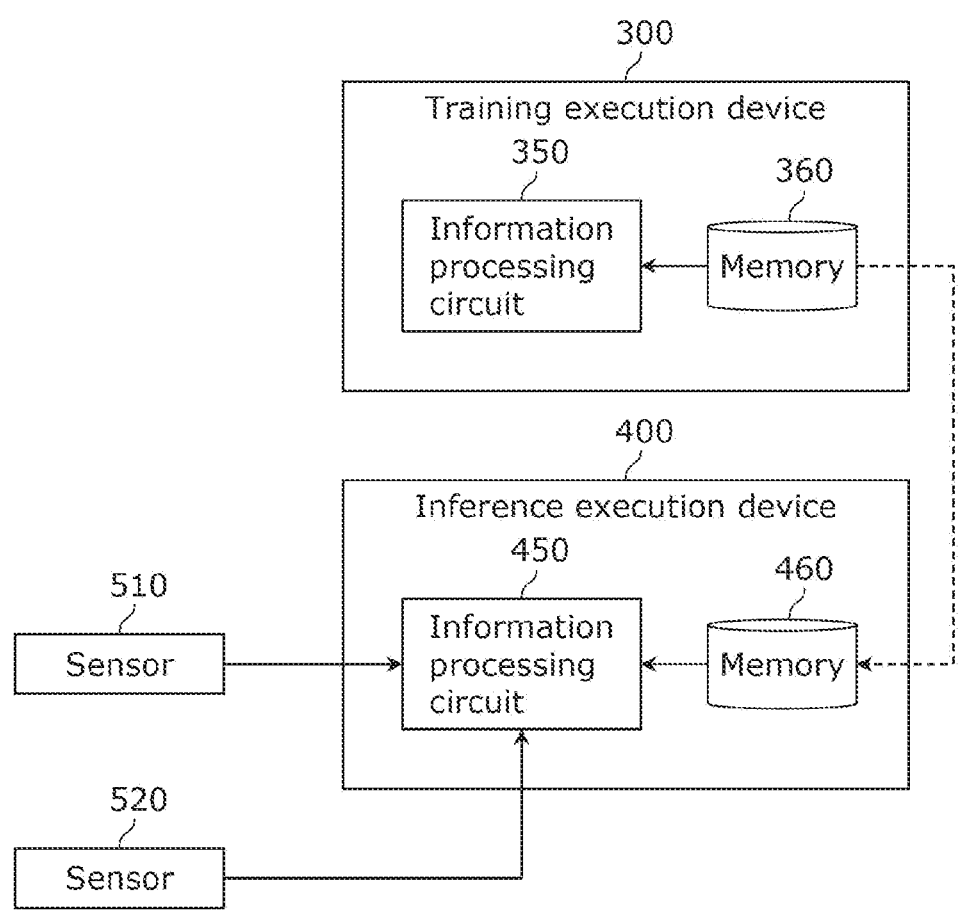
FIG. 5 is a block diagram illustrating the configurations of a training execution device and an inference execution device according to an embodiment.

FIG. 5 is a block diagram illustrating the configurations of a training execution device and an inference execution device according to an embodiment. As illustrated in FIG. 5, training execution device 300 includes information processing circuit 350 and memory 360, and inference execution device 400 includes information processing circuit 450 and memory 460.

Training execution device 300 may include a plurality of information processing circuits 350 and a plurality of memories 360. Inference execution device 400 may include a plurality of information processing circuits 450 and a plurality of memories 460. Training execution device 300 does not need to include memory 360; memory 360 may be external to training execution device 300. Inference execution device 400 does not need to include memory 460; memory 460 may be external to inference execution device 400.

Training execution device 300 executes training. For example, training execution device 300 may correspond to training execution device 100 described above or may be a high-performance, general-purpose computer. Information processing circuit 350 performs information processing. Information processing circuit 350 may be a general-purpose processor or may be a dedicated circuit.

The operation to be performed by training execution device 300 is performed mainly by information processing circuit 350. Hereinafter, there are cases where the operation performed by information processing circuit 350 is described as the operation performed by training execution device 300.

For example, information processing circuit 350 of training execution device 300 trains a training neural network. Furthermore, information processing circuit 350 generates a plurality of inference neural network candidates from the training neural network that has been trained, and stores the plurality of inference neural network candidates into memory 360 of training execution device 300.

Furthermore, a program for training the training neural network may be stored in memory 360 of training execution device 300. Information processing circuit 350 of training execution device 300 may train the training neural network by reading and executing the program stored in memory 360.

Moreover, the training neural network may be stored in memory 360 or a training dataset to be used to train the training neural network may be stored in memory 360.

Inference execution device 400 executes inference. For example, inference execution device 400 may correspond to inference execution device 200 described above or may be a low-performance, embedded device. Inference execution device 400 may be connected to sensors 510, 520. Information processing circuit 450 performs information processing. Information processing circuit 450 may be a general-purpose processor or may be a dedicated circuit.

The operation to be performed by inference execution device 400 is performed mainly by information processing circuit 450. Hereinafter, there are cases where the operation performed by information processing circuit 450 is described as the operation performed by inference execution device 400.

For example, the plurality of inference neural network candidates generated by training execution device 300 are stored into memory 460 of inference execution device 400. The plurality of inference neural network candidates may be copied from memory 360 of training execution device 300 into memory 460 of inference execution device 400 and thus be stored into memory 460.

Furthermore, using one inference neural network among the plurality of inference neural network candidates, information processing circuit 450 of inference execution device 400 executes inference on data obtained from sensor 510.

Furthermore, a program for executing inference using the inference neural network may be stored in memory 460 of inference execution device 400. Information processing circuit 450 of inference execution device 400 may read and execute the program stored in memory 460 and thus execute the inference using the inference neural network.

Furthermore, the program, the training neural network, or the plurality of inference neural network candidates described above may constitute an inference execution model for information processing circuit 450 of inference execution device 400 to execute inference using an inference neural network. Here, the inference execution model, which is a mathematical model for executing inference, means a model including a program and data such as a parameter. The inference execution model may be stored in memory 460 of inference execution device 400.

Sensor 510 obtains data by sensing. For example, sensor 510 is an image sensor that obtains video by sensing. Sensor 510 may sense sound to obtain data indicating the sound or may sense odors to obtain data indicating the odors. For example, the data obtained by sensor 510 is continuous data that temporally changes.

In the following description, mainly, video is obtained by sensor 510 and used as data subject to inference. However, other data may be obtained by sensor 510 and used as data subject to inference.

Sensor 520 measures an environment state. Specifically, sensor 520 measures an environment state in which the data is obtained by sensing. The environment state obtained by sensor 520 may be related to the location of the data obtainment by sensor 510, the illuminance level upon the data obtainment by sensor 510, or the time slot of the data obtainment by sensor 510.

For example, sensor 520 may be a position sensor supporting the global positioning system (GPS). Alternatively, sensor 520 may be an illuminance sensor. Furthermore, sensor 520 can also be referred to as a measuring instrument that measures an environment state. Sensor 520 may measure, as a measuring instrument, the time slot of the data obtainment by sensor 510. Sensor 520 may be a combination of a plurality of sensors.

The data obtained by sensor 510 is input to inference execution device 400, and inference is executed on the data obtained by sensor 510. Specifically, the data obtained by sensor 510 is video, and objects such as vehicles and pedestrians in the video are detected as the inference. The environment state measured by sensor 520 may be used to switch the inference neural network.

Figure 6:
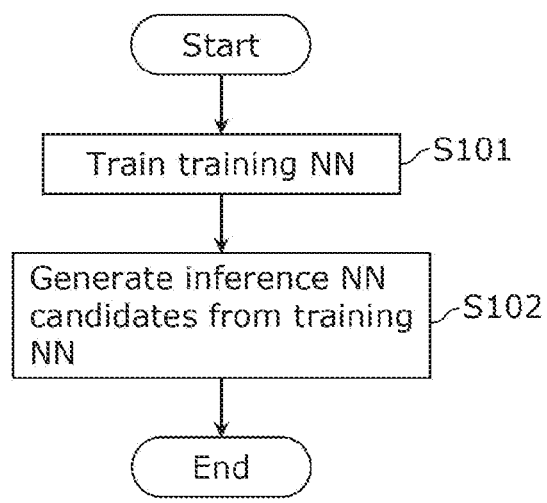
FIG. 6 is a flowchart illustrating the operation of a training execution device according to an embodiment.

FIG. 6 is a flowchart illustrating the operation of training execution device 300 illustrated in FIG. 5. First, training execution device 300 trains the training neural network (S101). For example, the training neural network is a fp32-bit CNN.

Subsequently, training execution device 300 generates a plurality of inference neural network candidates from one training neural network that has been trained (S102). For example, each of the plurality of inference neural network candidates is an int8-bit CNN. The plurality of inference neural network candidates have different dynamic ranges and different levels of resolution for numerical values such as parameters and data values.

Figure 7:
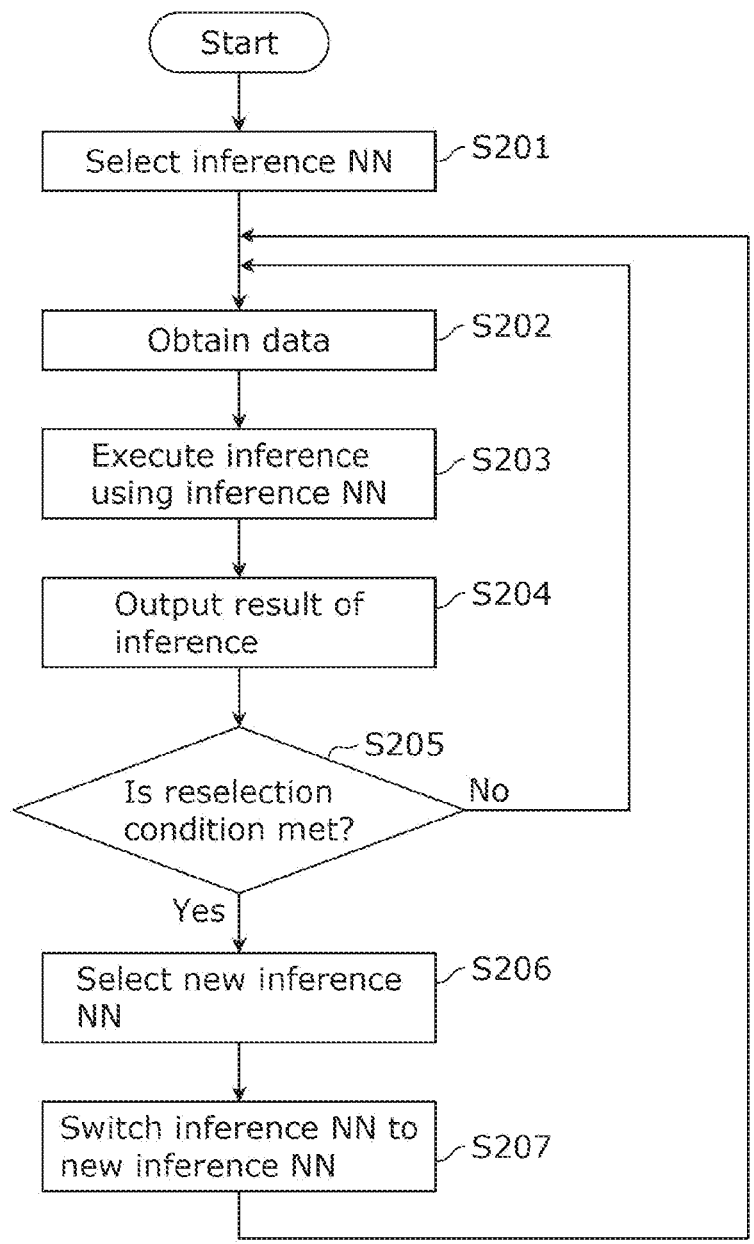
FIG. 7 is a flowchart illustrating the operation of an inference execution device according to an embodiment.

FIG. 7 is a flowchart illustrating the operation of inference execution device 400 illustrated in FIG. 5. First, inference execution device 400 selects an inference neural network from among the plurality of inference neural network candidates (S201). The plurality of inference neural network candidates are the plurality of neural networks generated by training execution device 300 from the training neural network.

Next, inference execution device 400 obtains the data input to the inference neural network (S202). For example, inference execution device 400 obtains video for detecting a vehicle. Next, inference execution device 400 executes inference using the inference neural network (S203). For example, inference execution device 400 executes, on the obtained data, inference for detecting a vehicle. Next, inference execution device 400 outputs the result of the inference (S204). For example, inference execution device 400 outputs a vehicle detection result.

Next, inference execution device 400 determines whether a reselection condition for the inference neural network is met (S205). For example, the reselection condition may be one of the following: (i) the accuracy is decreasing; (ii) the environment state has changed; and (iii) periodic timing has come.

More specifically, for example, when the accuracy is decreasing, when the environment state has changed, or when the periodic timing has come, inference execution device 400 may determine that the reselection condition is met. Alternatively, inference execution device 400 may determine, at the periodic timing, whether the accuracy is decreasing or whether the environment state has changed, and when the accuracy is decreasing or when the environment state has changed, determine that the reselection condition is met.

When the reselection condition is not met (No in S205), the processing from the data obtainment (S202) onward is repeated.

When the reselection condition is met (Yes in S205), inference execution device 400 selects a new inference neural network from among the plurality of inference neural networks (S206). Subsequently, inference execution device 400 switches the inference neural network to the new inference neural network (S207). Thereafter, the processing from the data obtainment (S202) onward is repeated. When an end condition is met, inference execution device 400 may end the series of processes.

This allows inference execution device 400 to adaptively apply an inference neural network among the plurality of inference neural network candidates. Thus, inference execution device 400 can minimize the decrease in accuracy. More specific operations of training execution device 300 and inference execution device 400 will be described below.

Figure 8:
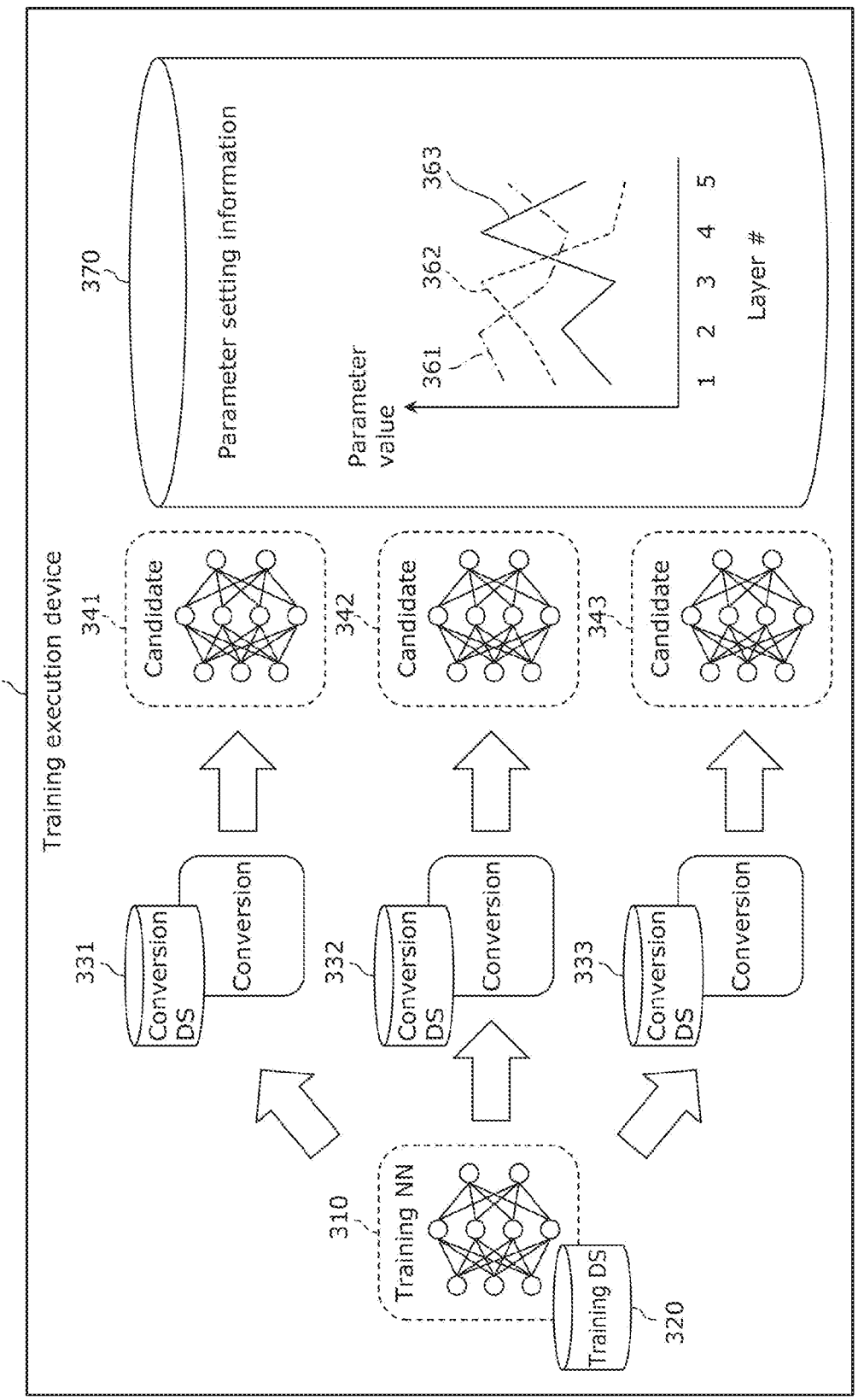
FIG. 8 is a conceptual diagram illustrating the operation of a training execution device according to an embodiment.

FIG. 8 is a conceptual diagram illustrating the operation of training execution device 300 illustrated in FIG. 5. Training execution device 300 trains training neural network 310 (training NN 310) using training dataset 320 (training DS 320). For example, training neural network 310 is a fp32-bit CNN.

Specifically, a parameter set of training neural network 310 is adjusted so that training neural network 310 outputs correct data for training dataset 320 input to training neural network 310.

Next, training execution device 300 converts one trained training neural network 310 into three inference neural network candidates 341, 342, 343 (candidates 341, 342, 343). Thus, training execution device 300 generates three inference neural network candidates 341, 342, 343. For example, each of three inference neural network candidates 341, 342, 343 is an int8-bit CNN.

In the conversion, training execution device 300 may use three conversion datasets 331, 332, 333 (conversion DSs 331, 332, 333). Each of three conversion datasets 331, 332, 333 may be a subset of training dataset 320.

For example, training execution device 300 inputs conversion dataset 331 to training neural network 310. Subsequently, training execution device 300 adjusts the parameter set of training neural network 310 so that the data values in training neural network 310 are expressed in int8 bits as appropriately as possible. Thus, training execution device 300 generates inference neural network candidate 341 by converting training neural network 310.

Similarly, using conversion dataset 332, training execution device 300 generates inference neural network candidate 342 by converting training neural network 310. Furthermore, using conversion dataset 333, training execution device 300 generates inference neural network candidate 343 by converting training neural network 310.

According to the foregoing, training execution device 300 generates three quantization neural networks having different dynamic ranges and different levels of resolution from training neural network 310 as three inference neural network candidates 341, 342, 343.

Training execution device 300 may generate three inference neural network candidates 341, 342, 343 from training neural network 310 according to at least one of the dynamic range and the resolution designated by a user. The dynamic range and the resolution may be designated for each intermediate layer of training neural network 310.

For example, a user may observe, for each intermediate layer, the data values obtained when conversion dataset 331 is input to training neural network 310. Furthermore, a user may designate a dynamic range and resolution for each intermediate layer according to the observed data values. Moreover, training neural network 310 may be converted into inference neural network candidate 341 according to the dynamic range or the resolution designated by the user.

Similarly, inference neural network candidate 342 may be generated using conversion dataset 332 by way of observation of the data values in training neural network 310 by a user and designation of a dynamic range and resolution by the user. Furthermore, inference neural network candidate 343 may be generated using conversion dataset 333 by way of observation of the data values in training neural network 310 by a user and designation of a dynamic range and resolution by the user.

Three inference neural network candidates 341, 342, 343 may be represented by three parameter sets 361, 362, 363, respectively. Three parameter sets 361, 362, 363 indicate the parameter values of the respective layers of a neural network. Three parameter sets 361, 362, 363 representing three inference neural network candidates 341, 342, 343 may be stored into memory 360 of training execution device 300 as parameter setting information 370.

Three generated inference neural network candidates 341, 342, 343 are introduced into inference execution device 400 and used for inference. Therefore, three parameter sets 361, 362, 363 representing three inference neural network candidates 341, 342, 343 may be stored into memory 460 of inference execution device 400.

Figure 9:
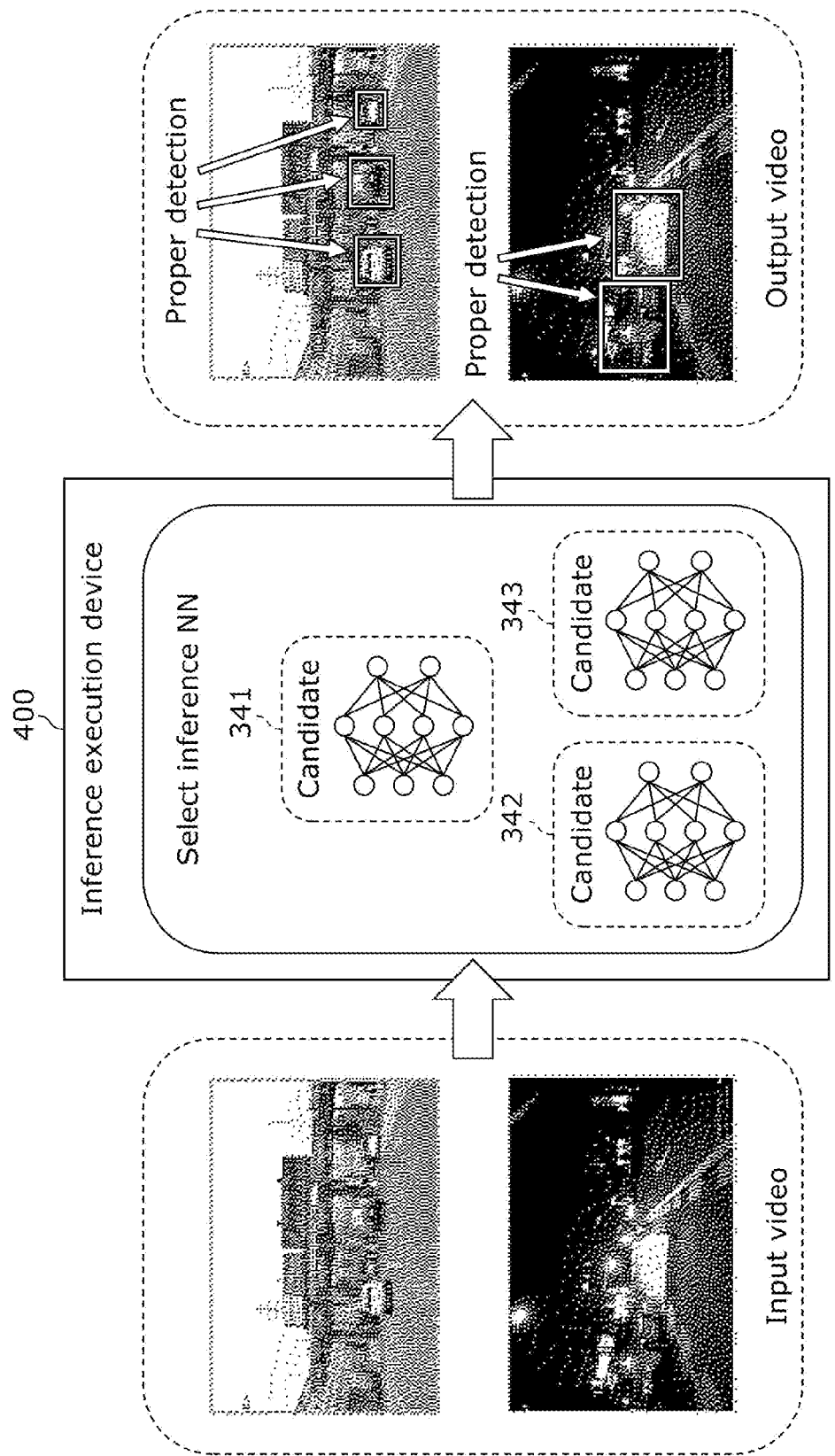
FIG. 9 is a conceptual diagram illustrating the operation of an inference execution device according to an embodiment.

FIG. 9 is a conceptual diagram illustrating the operation of inference execution device 400 illustrated in FIG. 5. For example, inference execution device 400 executes, on input video, inference for detecting a vehicle, and outputs the result of the inference as output video.

At this time, inference execution device 400 selects an inference neural network from among three inference neural network candidates 341, 342, 343. Each of three inference neural network candidates 341, 342, 343 is an int8-bit CNN generated by training execution device 300 from the fp32-bit CNN. Subsequently, inference execution device 400 executes inference using the inference neural network.

Inference execution device 200 illustrated in FIG. 4 executes the inference using fixed inference neural network 140 having a fixed parameter set. Therefore, false detection, detection failures, etc., occur. In contrast, inference execution device 400 illustrated in FIG. 9 can execute the inference by switching the inference neural network between three inference neural network candidates 341, 342, 343.

Specifically, inference execution device 400 can evaluate the respective parameter sets of three inference neural network candidates 341, 342, 343 on the input video corresponding to an evaluation scene, and select a parameter set suitable for the input video. In other words, inference execution device 400 can dynamically switch the parameter set for the input video. Thus, inference execution device 400 can minimize false detection and detection failures.

Figure 10:
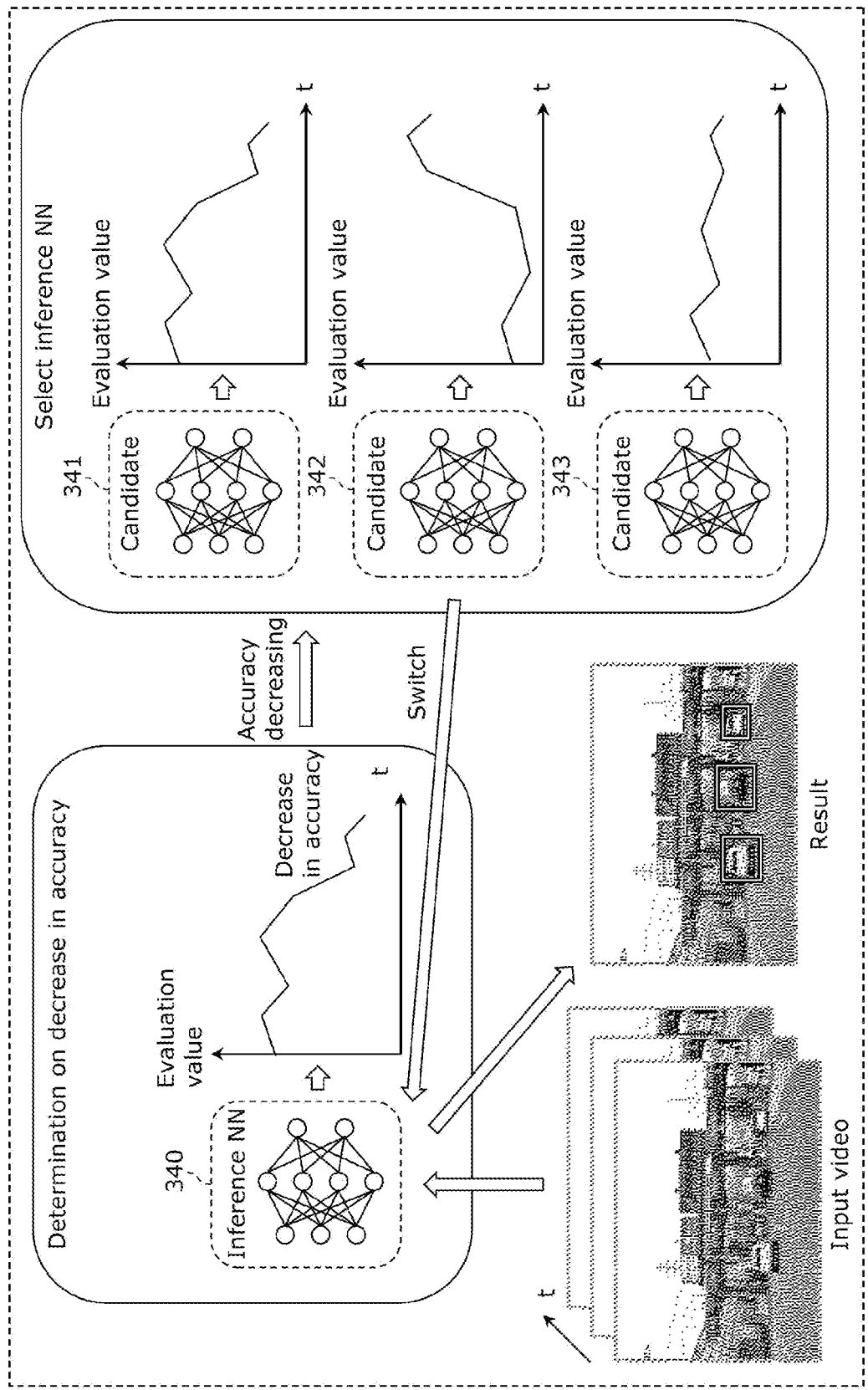
FIG. 10 is a conceptual diagram illustrating a specific example of the operation of an inference execution device according to an embodiment.

FIG. 10 is a conceptual diagram illustrating a specific example of the operation of inference execution device 400 illustrated in FIG. 5. For example, inference execution device 400 executes the inference on the input video using inference neural network 340 (inference NN 340) selected from among the plurality of inference neural network candidates 341 to 343.

Furthermore, at the time of execution of the inference, inference execution device 400 evaluates inference neural network 340. For example, inference execution device 400 observes the likelihood related to the result of the inference and the data values in the intermediate layer, and thus evaluates the inference accuracy. At this time, inference execution device 400 may calculate an evaluation value for inference neural network 340 according to an evaluation function.

Specifically, inference execution device 400 may evaluate inference neural network 340 according, for example, to whether the data value in inference neural network 340 is included in a range corresponding to the dynamic range. The input video changes over time t, and thus the evaluation value for inference neural network 340 also changes over time t.

For example, inference execution device 400 determines deterioration in the evaluation result (that is, the evaluation value) for inference neural network 340 as a sign of a decrease in accuracy. When the evaluation value is lower than a threshold value, inference execution device 400 may determine that the accuracy is decreasing.

When the accuracy is determined to be decreasing, inference execution device 400 evaluates each of the plurality of candidates 341 to 343. Inference execution device 400 may evaluate each of the plurality of candidates 341 to 343 except the candidate selected as inference neural network 340. Inference execution device 400 may evaluate each of the plurality of candidates 341 to 343 using the input video in the same manner as inference execution device 400 evaluates inference neural network 340.

Specifically, inference execution device 400 may calculate an evaluation value for each of candidates 341 to 343 according to the evaluation function. For example, inference execution device 400 may input the input video to each of candidates 341 to 343 and evaluate each of candidates 341 to 343 according, for example, to whether the data value in the candidate is included in the range corresponding to the dynamic range. Subsequently, inference execution device 400 selects a highly evaluated candidate and switches inference neural network 340 to the selected candidate.

For example, inference execution device 400 selects a candidate having the highest resolution from among one or more candidates included in candidates 341 to 343 and having the data value included in the range corresponding to the dynamic range, and switches inference neural network 340 to the selected candidate.

This allows inference execution device 400 to execute the inference according to appropriate dynamic range and resolution. Thus, inference execution device 400 can properly output the result of the inference.

Figure 11:
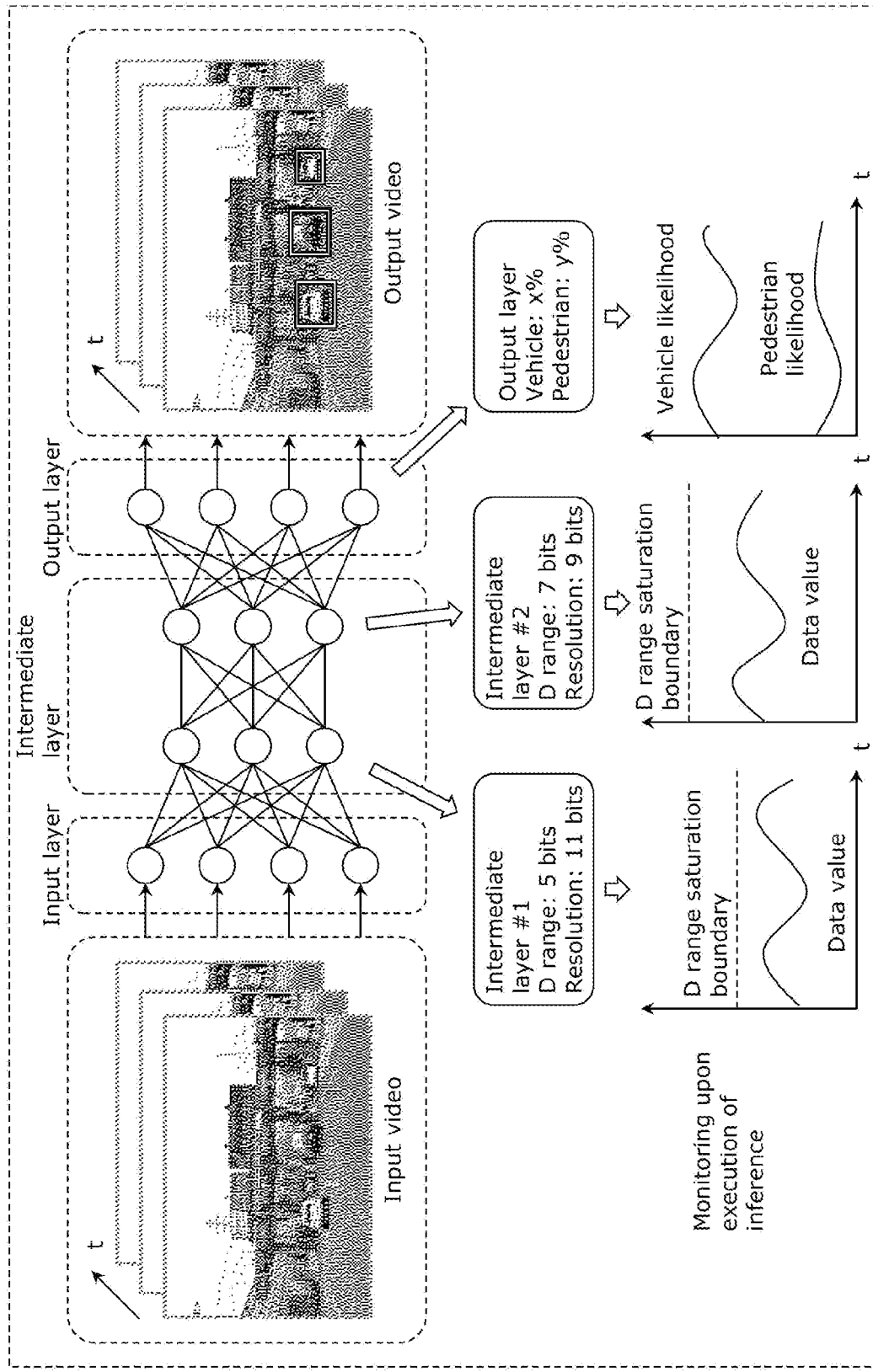
FIG. 11 is a conceptual diagram illustrating an observation process according to an embodiment.

FIG. 11 is a conceptual diagram illustrating an observation process performed by inference execution device 400 illustrated in FIG. 5. For example, each of candidates 341 to 343 includes an input layer, a plurality of intermediate layers, and an output layer. Inference neural network 340 selected from among candidates 341 to 343 also includes an input layer, a plurality of intermediate layers, and an output layer.

For example, a first intermediate layer (intermediate layer #1) of inference neural network 340 has a dynamic range for five bits and resolution for 11 bits. A second intermediate layer (intermediate layer #2) of inference neural network 340 has a dynamic range for seven bits and resolution for nine bits. The output layer of inference neural network 340 indicates the likelihood of each of a plurality of classes including a vehicle class and a pedestrian class.

A change in each of the data value and the likelihood when the input video is input to inference neural network 340 described above is monitored. Subsequently, inference neural network 340 is evaluated according to at least one of the data value and the likelihood monitored, and it is determined whether the accuracy is decreasing. Specifically, whether the accuracy is decreasing is determined according to the value of the likelihood or the distribution of data values with respect to the boundary of saturation of the dynamic range.

Figure 12A:
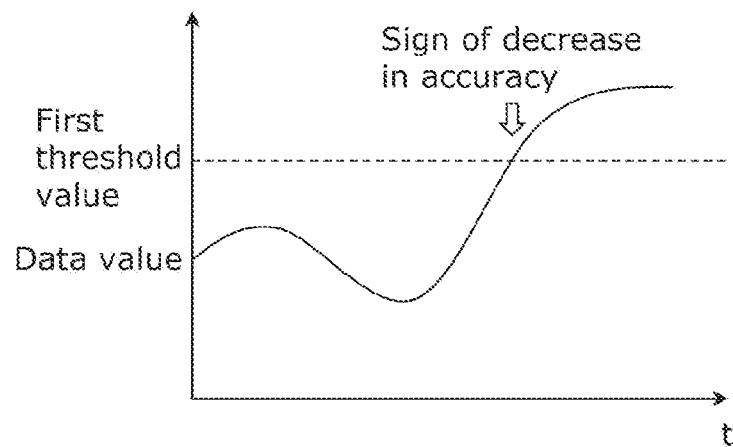
FIG. 12A is a conceptual diagram illustrating the first specific example of accuracy decrease determination according to an embodiment.

FIG. 12A is a conceptual diagram illustrating the first specific example of accuracy decrease determination performed by inference execution device 400 illustrated in FIG. 5. For example, when the data value is outside a first threshold value range, inference execution device 400 determines that the accuracy is decreasing. In other words, inference execution device 400 detects, as a sign of a decrease in accuracy, the data value having exceeded the first threshold value range. The first threshold value range may be set to be, for example, 80% of the maximum range corresponding to the dynamic range.

For example, when the data value exceeds the maximum range corresponding to the dynamic range, a decrease in accuracy due to a failure to properly express the data value is expected. Therefore, it is useful to determine, according to whether the data value exceeds the first threshold value range, whether the accuracy is decreasing.

Figure 12B:
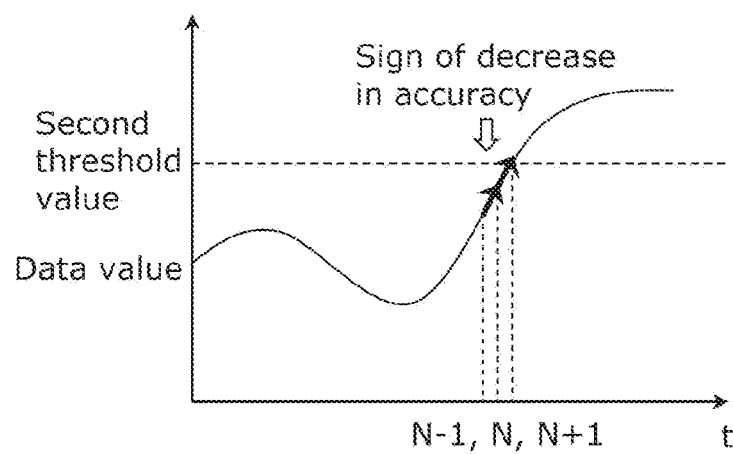
FIG. 12B is a conceptual diagram illustrating the second specific example of accuracy decrease determination according to an embodiment.

FIG. 12B is a conceptual diagram illustrating the second specific example of the accuracy decrease determination performed by inference execution device 400 illustrated in FIG. 5. For example, inference execution device 400 predicts a data value, and when the predicted data value is outside a second threshold value range, determines that the accuracy is decreasing. In other words, inference execution device 400 detects, as a sign of a decrease in accuracy, the predicted data value having exceeded the second threshold value range.

Specifically, according to the difference between the data value at time N−1 and the data value at time N, inference execution device 400 predicts a data value at time N+1. More specifically, inference execution device 400 predicts the data value at time N+1 by adding the data value at time N to the difference between the data value at time N−1 and the data value at time N. Subsequently, according to whether the predicted data value exceeds the second threshold value range, inference execution device 400 determines whether the accuracy is decreasing.

Time N−1, time N, and time N+1 may correspond to the N−1$^{-th}$ frame of the input video, the N$^{-th}$ frame of the input video, and the N+1$^{-th}$ frame of the input video, respectively. Similar to the first threshold value range in the example illustrated in FIG. 12A, the second threshold value range may be set to be, for example, 80% of the maximum range corresponding to the dynamic range. Alternatively, the second threshold value range may be set to be a percentage different from the percentage set for the first threshold value range in the example illustrated in FIG. 12A. This means that the second threshold value range may be the same as the first threshold value range or may be different from the first threshold value range.

Figure 12C:
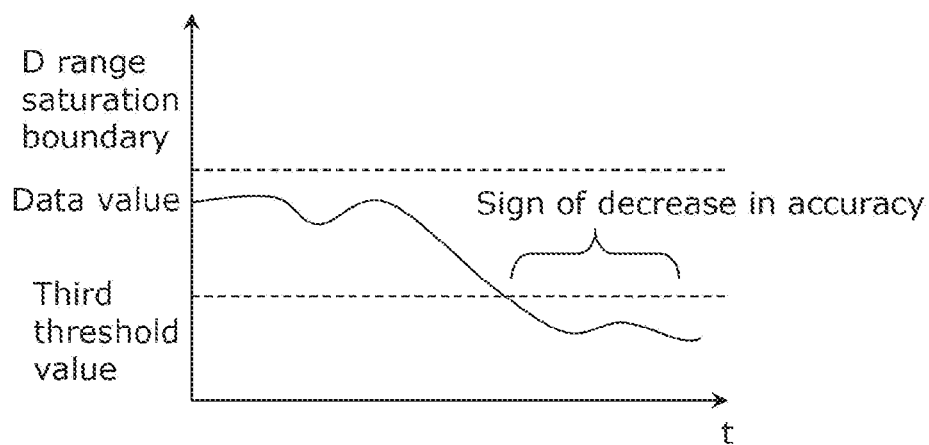
FIG. 12C is a conceptual diagram illustrating the third specific example of accuracy decrease determination according to an embodiment.

FIG. 12C is a conceptual diagram illustrating the third specific example of the accuracy decrease determination performed by inference execution device 400 illustrated in FIG. 5. For example, when the data value continuously remains within a third threshold value range throughout a first segment of data that is the input video, inference execution device 400 determines that the accuracy is decreasing. In other words, inference execution device 400 detects, as a sign of a decrease in accuracy, that the data value continuously remains within the third threshold value range throughout the first segment.

The first segment is a time segment to be set for data. The first segment may be a time interval of 10 minutes or the like or may be determined by the amount of data, such as 500 frames, in the data that is the input video. The third threshold value range may be set to be, for example, 50% of the maximum range corresponding to the dynamic range. The third threshold value range may be the same as at least one of the first threshold value range and the second threshold value range or may be different from both the first threshold value range and the second threshold value range. In particular, the third threshold value range may be smaller than the first threshold value range and the second threshold value range.

For example, when the data value continues to transition within a small range, the resolution is considered to have continuously remained low. Therefore, it is useful to determine, according to whether the data value continuously remains within the third threshold value range throughout the first segment, whether the accuracy is decreasing.

Figure 12D:
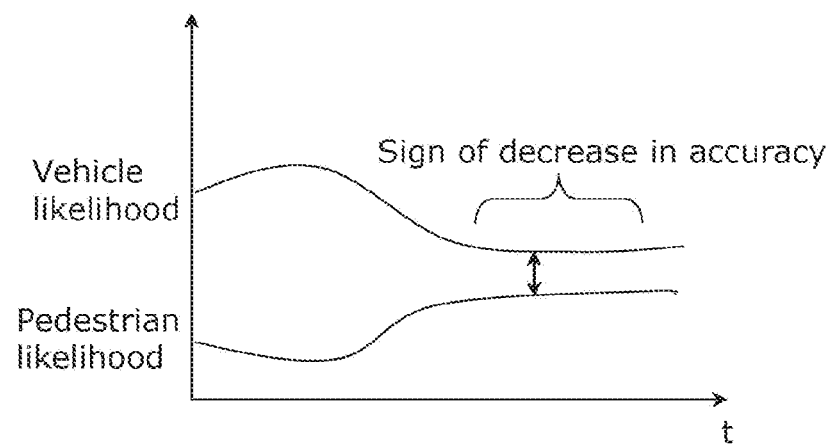
FIG. 12D is a conceptual diagram illustrating the fourth specific example of accuracy decrease determination according to an embodiment.

FIG. 12D is a conceptual diagram illustrating the fourth specific example of the accuracy decrease determination performed by inference execution device 400 illustrated in FIG. 5. For example, when the likelihood continuously remains lower than a reference throughout a second segment of data that is the input video, inference execution device 400 determines that the accuracy is decreasing. In other words, inference execution device 400 detects, as a sign of a decrease in accuracy, that the likelihood continuously remains lower than the reference throughout the second segment.

Specifically, when the likelihood in the output layer continuously remains lower than a likelihood threshold value which is the reference, inference execution device 400 may determine that the accuracy is decreasing. This likelihood threshold value may be relatively determined depending on other classes. Specifically, when the difference between the likelihood in an evaluation target class and the likelihood in another class remans small, inference execution device 400 may determine that the accuracy is decreasing. The evaluation target class may be a class having the highest likelihood. The other class may be a class having the second highest likelihood.

The second segment is a time segment to be set for data, as with the first segment in the example illustrated in FIG. 12C. The second segment may be a time interval of 10 minutes or the like or may be determined by the amount of data, such as 500 frames, in the data that is the input video. The length of the second segment may be the same as or different from the length of the first segment.

For example, when the failure to obtain high likelihood continues, appropriate inference may have not been executed. This means that when the failure to obtain high likelihood continues, the accuracy may be decreasing. Therefore, it is useful to determine, according to whether the likelihood continuously remains lower than the reference throughout the second segment, whether the accuracy is decreasing.

Four accuracy decrease determination conditions described above may be combined. For example, when one of the four accuracy decrease determination conditions is met, inference execution device 400 may determine that the accuracy is decreasing. Alternatively, when at least two of the four accuracy decrease determination conditions are met, inference execution device 400 may determine that the accuracy is decreasing.

In particular, the third specific example and the fourth specific example may be combined. Specifically, when the data value continuously remains within the third threshold value range throughout a determination process segment and the likelihood continuously remains lower than the reference throughout the same determination process segment, inference execution device 400 may determine that the accuracy is decreasing. Thus, it is properly determined whether the accuracy is decreasing.

Furthermore, inference execution device 400 may determine, according to the environment state obtained from sensor 520, whether the accuracy is decreasing. For example, when the environment state from sensor 520 changes, inference execution device 400 may determine that the accuracy is decreasing. Specifically, when the environment state from sensor 520 changes from the first category corresponding to the first environment state candidate to the second category corresponding to the second environment state candidate, inference execution device 400 may determine that the accuracy is decreasing.

Figure 13:
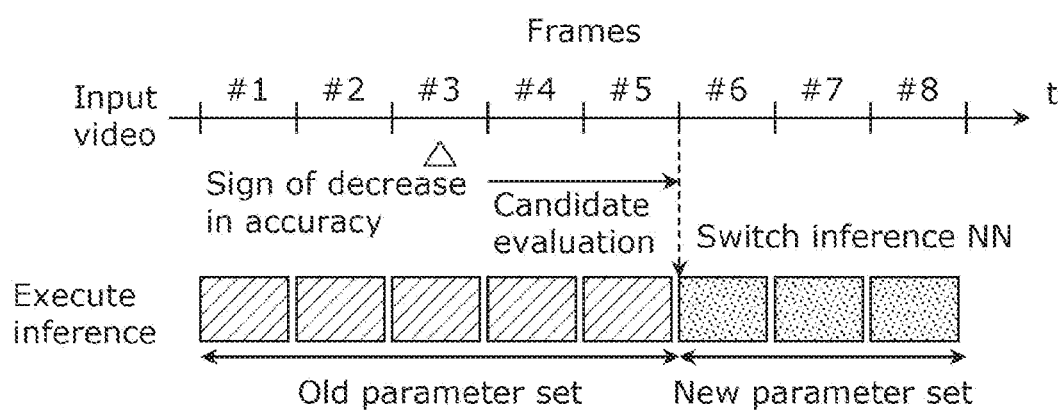
FIG. 13 is a timing diagram illustrating the timing of switching of an inference neural network according to an embodiment.

FIG. 13 is a timing diagram illustrating the timing of switching of an inference neural network that is used in inference execution device 400 illustrated in FIG. 5. When the accuracy is determined to be decreasing or when a sign of a decrease in accuracy is detected, inference execution device 400 selects a new inference neural network according to the evaluation on the plurality of inference neural network candidates. Subsequently, inference execution device 400 switches the inference neural network to the new inference neural network.

In the example illustrated in FIG. 13, a sign of a decrease in accuracy is detected in the third frame (frame #3), and a plurality of inference neural network candidates are evaluated using the fourth frame (frame #4) and the fifth frame (frame #5). Subsequently, the inference neural network is switched to a new inference neural network selected from among the plurality of inference neural network candidates according to the evaluation result.

Furthermore, from the sixth frame (frame #6) onward, inference is executed using the new inference neural network. Specifically, the inference neural network with the old parameter set is used in the frames up to the fifth frame (frame #5), and the inference neural network with the new parameter set is used in the sixth frame (frame #6) and the following frames.

Figure 14:
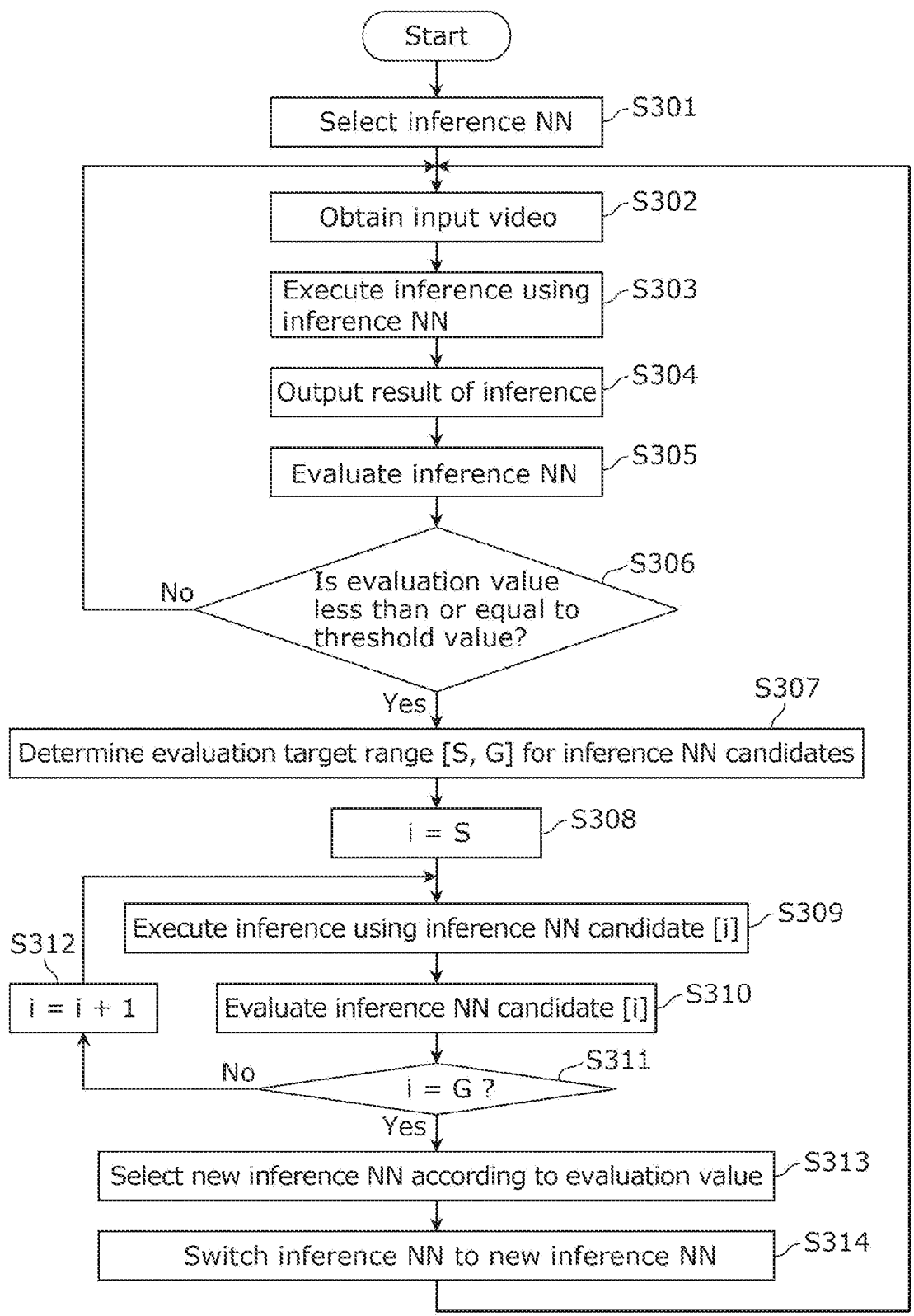
FIG. 14 is a flowchart illustrating a specific example of the operation of an inference execution device according to an embodiment.

FIG. 14 is a flowchart illustrating a specific example of the operation of inference execution device 400 illustrated in FIG. 5. First, inference execution device 400 selects an inference neural network from among the plurality of inference neural network candidates (S301). At this time, inference execution device 400 may select an average inference neural network candidate from among the plurality of inference neural network candidates as the inference neural network.

Next, inference execution device 400 obtains the input video to be input to the inference neural network (S302). For example, inference execution device 400 obtains the input video at an interval of N frames. In other words, inference execution device 400 obtains N frames of the input video and then performs the next process.

Next, inference execution device 400 executes the inference on the obtained input video using the inference neural network (S303). Next, inference execution device 400 outputs the result of the inference (S304).

Furthermore, inference execution device 400 evaluates the inference neural network (S305). Specifically, inference execution device 400 evaluates the parameter set of the inference neural network. Subsequently, inference execution device 400 derives the result of the evaluation as an evaluation value. At the time of executing the inference on the input video using the inference neural network, inference execution device 400 may monitor the inference neural network to evaluate the inference neural network.

Subsequently, inference execution device 400 determines whether the evaluation value is less than or equal to a threshold value (S306). When the evaluation value is determined as being not less than or equal to the threshold value (No in S306), that is, when the evaluation value is determined as being greater than the threshold value, inference execution device 400 repeats the processing from the obtainment of the input video (S302) onward.

When the evaluation value is determined as being less than or equal to the threshold value (Yes in S306), inference execution device 400 determines evaluation target range [S, G] for the plurality of inference neural network candidates (S307).

Specifically, inference execution device 400 determines an index range indicating one or more inference neural network candidates subject to the evaluation among the plurality of inference neural network candidates respectively indicated by a plurality of index values. The smallest index value in the index range indicating one or more inference neural network candidates subject to the evaluation is denoted as S. The largest index value in the index range indicating one or more inference neural network candidates subject to the evaluation is denoted as G.

Next, inference execution device 400 assigns S to i which is an index value indicating the inference neural network candidate subject to the evaluation (S308). Next, inference execution device 400 executes the inference on the input video using inference neural network candidate [i] indicated by i (S309).

Furthermore, inference execution device 400 evaluates inference neural network candidate [i] (S310). Specifically, inference execution device 400 evaluates the parameter set of inference neural network candidate [i]. Subsequently, inference execution device 400 derives the result of the evaluation as an evaluation value. At the time of executing the inference on the input video using inference neural network candidate [i], inference execution device 400 may monitor inference neural network candidate [i] to evaluate inference neural network candidate [i].

Next, inference execution device 400 determines whether i is equal to G (S311). When i is determined as not being equal to G (No in S311), inference execution device 400 adds 1 to i (S312). Subsequently, inference execution device 400 repeats the processing from the execution of the inference (S309) onward.

When i is determined as being equal to G (Yes in S311), inference execution device 400 selects a new inference neural network according to one or more evaluation values for the one or more inference neural network candidates subject to the evaluation (S313). For example, inference execution device 400 selects, as the new inference neural network, an inference neural network candidate to which the highest evaluation value has been provided. Subsequently, inference execution device 400 switches the inference neural network to the new inference neural network (S314).

According to the environment state measured by sensor 520, inference execution device 400 may select an inference neural network corresponding to the environment state from among the plurality of inference neural network candidates. Therefore, training execution device 300 may generate a plurality of inference neural network candidates corresponding to a plurality of environment state candidates.

Figure 15:
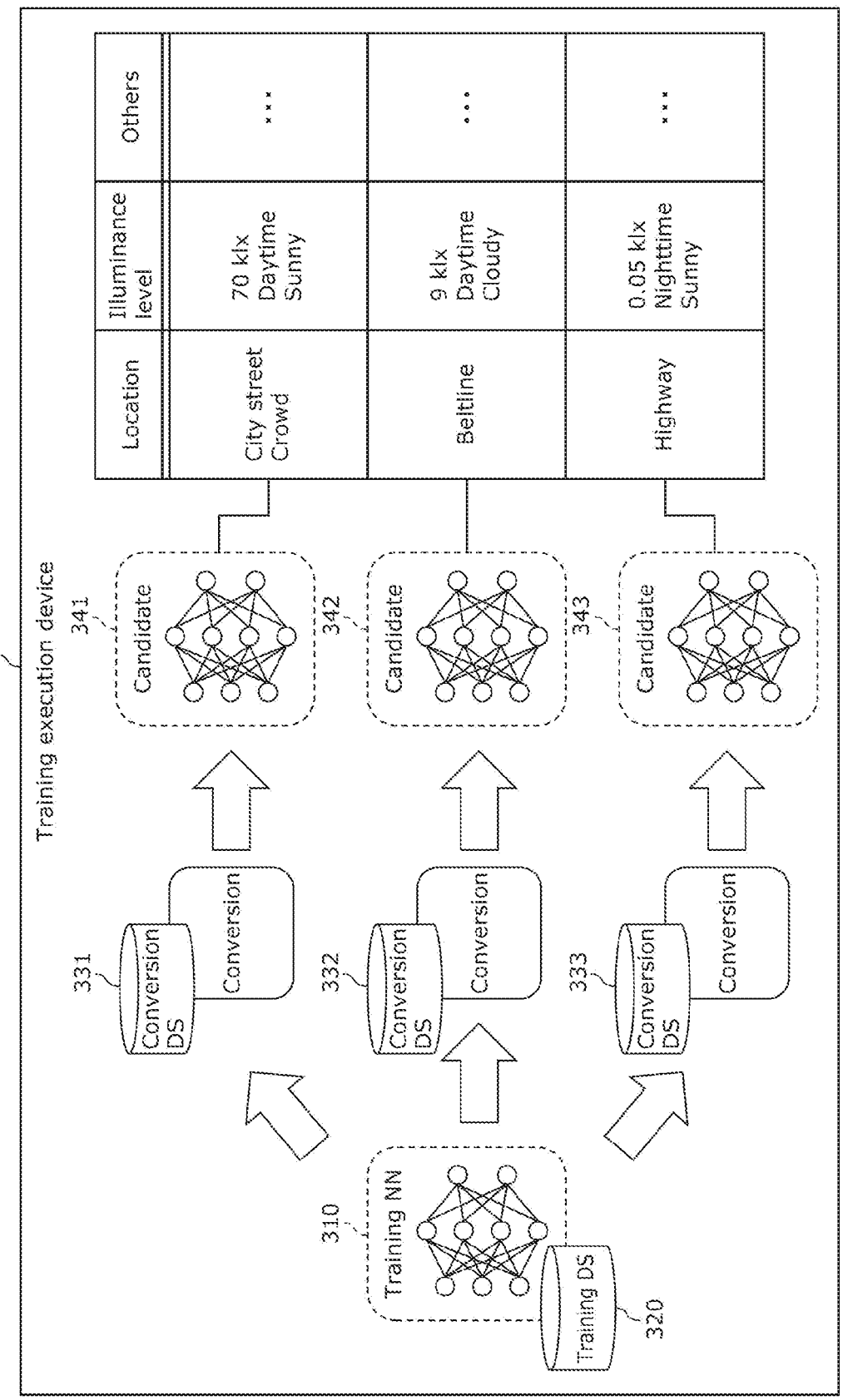
FIG. 15 is a conceptual diagram illustrating the relationship between an inference neural network candidate and an environment state candidate according to an embodiment.

FIG. 15 is a conceptual diagram illustrating the relationship between the inference neural network candidate generated by training execution device 300 illustrated in FIG. 5 and the environment state candidate. Similar to the example illustrated in FIG. 8, training execution device 300 generates a plurality of inference neural network candidates 341 to 343. In the example illustrated in FIG. 15, furthermore, the plurality of inference neural network candidates 341 to 343 are respectively associated with a plurality of environment state candidates.

Specifically, in the example illustrated in FIG. 15, inference neural network candidate 341 is associated with the locations of a city street and a crowd and an illuminance level of 70 klx in the daytime on a sunny day. Inference neural network candidate 342 is associated with the location of a beltline and an illuminance level of 9 klx in the daytime on a cloudy day. Inference neural network candidate 343 is associated with the location of a highway and an illuminance level of 0.05 klx in the nighttime on a sunny day.

This association may be determined according to the plurality of conversion datasets 331 to 333.

Specifically, conversion dataset 331 may be a dataset corresponding to the locations of a city street and a crowd and an illuminance level of 70 klx in the daytime on a sunny day. Conversion dataset 332 may be a dataset corresponding to the location of a beltline and an illuminance level of 9 klx in the daytime on a cloudy day. Conversion dataset 333 may be a dataset corresponding to the locations of a city street and a crowd, the location of a highway, and an illuminance level of 0.05 klx in the nighttime on a sunny day.

Training execution device 300 may store, into memory 360 of training execution device 300, information indicating the plurality of inference neural network candidates 341 to 343, the plurality of environment state candidates, and the corresponding relationship between these candidates. Furthermore, the information indicating these may be copied from memory 360 of training execution device 300 into memory 460 of inference execution device 400.

Figure 16:
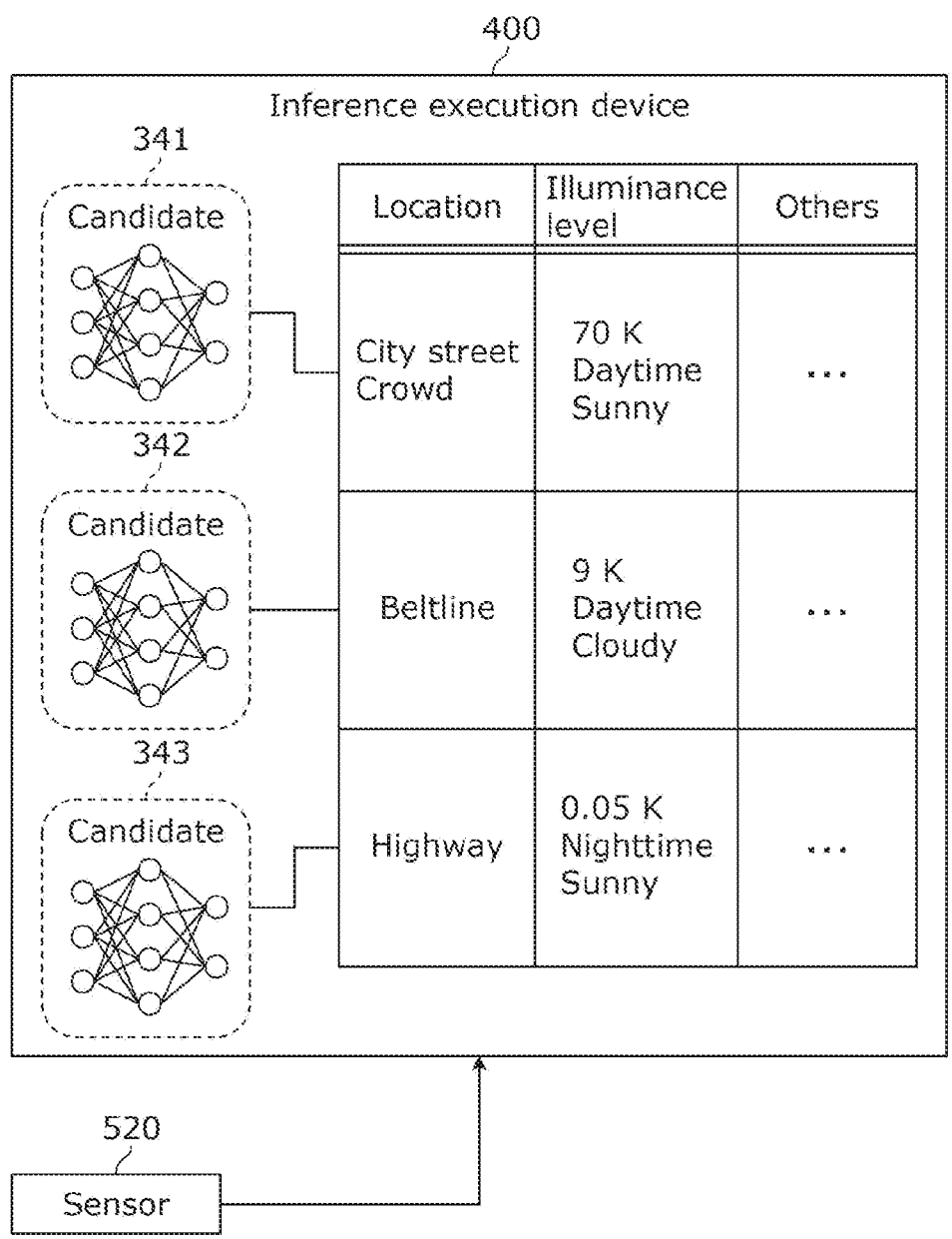
FIG. 16 is a conceptual diagram illustrating a selection process based on the state of environment according to an embodiment.

FIG. 16 is a conceptual diagram illustrating a selection process performed according to the environment state by inference execution device 400 illustrated in FIG. 5.

For example, inference execution device 400 obtains an environment state from sensor 520. As sensor 520, a position sensor for obtaining location information and an illuminance sensor for obtaining illuminance information may be used.

Subsequently, according to the environment state obtained from sensor 520, inference execution device 400 selects an inference neural network candidate corresponding to the environment state as a new inference neural network candidate from among the plurality of inference neural network candidates 341 to 343. Furthermore, inference execution device 400 switches the inference neural network to the new inference neural network.

In the example illustrated in FIG. 15 and FIG. 16, a location and an illuminance level are used, but other information may be used instead of the location, the illuminance level, or both of these, and other information may be used in addition to both of these. For example, a time slot may be used.

Figure 17:
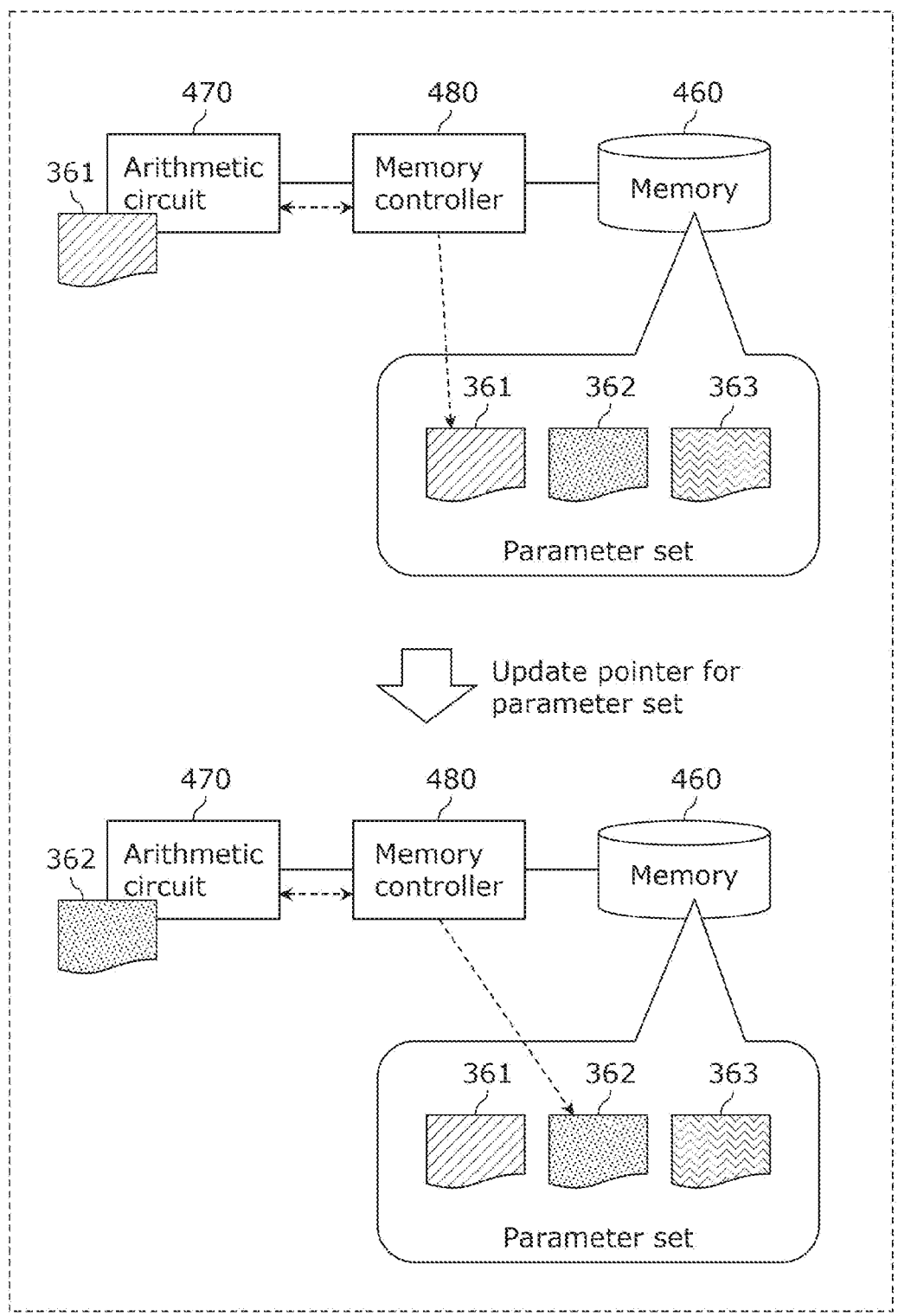
FIG. 17 is a conceptual diagram illustrating a specific example of a switching process according to an embodiment.

FIG. 17 is a conceptual diagram illustrating a specific example of the switching process performed by inference execution device 400 illustrated in FIG. 5. For example, information processing circuit 450 of inference execution device 400 includes arithmetic circuit 470 and memory controller 480. The plurality of parameter sets 361 to 363 which correspond respectively to the plurality of inference neural network candidates 341 to 343 are stored in memory 460.

In this example, arithmetic circuit 470 reads, for each frame, the parameter set to be read. Specifically, first, arithmetic circuit 470 reads parameter set 361 corresponding to inference neural network candidate 341 selected, among the plurality of parameter sets 361 to 363, via memory controller 480 as the parameter set to be read. Subsequently, arithmetic circuit 470 executes the inference using parameter set 361.

Memory controller 480 has a role to mediate access to memory 460. Arithmetic circuit 470 updates a pointer indicating the parameter set to be read in switching of the inference neural network. Specifically, in this example, arithmetic circuit 470 changes the pointer indicating parameter set 361 into the pointer indicating parameter set 362 to update the pointer indicating the parameter set to be read.

Thus, arithmetic circuit 470 reads parameter set 362 corresponding to new inference neural network candidate 342 among the plurality of parameter sets 361 to 363 via memory controller 480 as the parameter set to be read. Subsequently, arithmetic circuit 470 executes the inference using parameter set 362.

This allows inference execution device 400 to properly switch the parameter set to be read among the plurality of parameter sets 361 to 363. In other words, inference execution device 400 can properly switch the inference neural network among the plurality of inference neural network candidates 341 to 343.

The inference neural network may be switched at a point in time when the accuracy is determined to be decreasing, may be switched at a point in time when the environment state changes, or may be switched on a regular basis corresponding to a fixed time interval. Furthermore, the inference neural network may be selected according to the evaluation using the input video or the like or may be selected according to the environment state.

Furthermore, the neural network is not limited to the convolutional neural network and may be another neural network. The number of neural network candidates for reference is not limited to three and may be two or may be four or more.

As described above, for example, in the inference execution method according to one aspect of the present disclosure, at least one information processing circuit (450) executes inference on data using the inference neural network.

Specifically, for example, an inference neural network is selected from among the plurality of inference neural network candidates (341 to 343) generated from one training neural network that has been trained (S201). Subsequently, data is sequentially obtained (S202), inference is sequentially executed on the sequentially obtained data using the inference neural network (S203), and the results of the sequentially executed inference are sequentially output (S204).

Furthermore, a new inference neural network is selected from among the plurality of inference neural network candidates (341 to 343) during an inference execution period (S206). Here, the inference execution period is a period during which the data is sequentially obtained, the inference is sequentially executed, and the results of the inference are sequentially output. Subsequently, the inference neural network to be used in the execution of the inference is switched to a new inference neural network (S207).

Thus, in the inference phase, it may become possible to adaptively apply an inference neural network among the plurality of inference neural network candidates (341 to 343). Therefore, it may become possible to minimize the decrease in accuracy in the inference phase.

Furthermore, for example, the plurality of inference neural network candidates (341 to 343) may have different dynamic ranges and different levels of resolution. Thus, it may become possible to adaptively apply an inference neural network among the plurality of inference neural network candidates (341 to 343) that have different dynamic ranges and different levels of resolution. Therefore, it may become possible to minimize the decrease in accuracy in the inference phase.

Furthermore, for example, the plurality of inference neural network candidates (341 to 343) may correspond respectively to a plurality of environment state candidates that are a plurality of candidates of an environment state in which the data is obtained by sensing. With this, it may become possible to adaptively apply an inference neural network among the plurality of inference neural network candidates (341 to 343) that correspond respectively to the plurality of environment state candidates. Therefore, it may become possible to minimize the decrease in accuracy in the inference phase.

Furthermore, for example, the environment state may include an attribute related to a location, an illuminance level, or a time slot. With this, it may become possible to adaptively apply an inference neural network among the plurality of inference neural network candidates (341 to 343) that correspond respectively to a plurality of locations, a plurality of illuminance levels, or a plurality of time slots. Therefore, it may become possible to minimize the decrease in accuracy in the inference phase.

Furthermore, for example, during the inference execution period, each of one or more inference neural network candidates among the plurality of inference neural network candidates (341 to 343) may be evaluated using the sequentially obtained data. In addition, a new inference neural network may be selected from among the one or more inference neural network candidates according to the evaluation result.

With this, it may become possible to properly select an inference neural network from among the plurality of inference neural network candidates (341 to 343) according to the evaluation result. Therefore, it may become possible to minimize the decrease in accuracy in the inference phase.

Furthermore, for example, a neural network having the highest resolution among one or more inference neural network candidates each having a dynamic range including, in an allowable range, a data value used in the inference may be selected as a new inference neural network.

With this, it may become possible to select, from among the plurality of inference neural network candidates (341 to 343), an inference neural network in which the data value can be properly expressed. Therefore, it may become possible to minimize the decrease in accuracy in the inference phase.

Furthermore, for example, the environment state may be obtained from a measuring instrument (520) that measures the environment state. In addition, a neural network corresponding to the environment state may be selected as a new inference neural network according to the environment state from among the plurality of inference neural network candidates (341 to 343) that correspond respectively to the plurality of environment state candidates.

With this, it may become possible to properly select an inference neural network from among the plurality of inference neural network candidates (341 to 343) according to the environment state. Therefore, it may become possible to minimize the decrease in accuracy in the inference phase.

Furthermore, for example, whether the inference accuracy is decreasing may be determined during the inference execution period. When the accuracy is determined to be decreasing, a new inference neural network may be selected. Subsequently, the inference neural network may be switched to the new inference neural network.

With this, it may become possible to properly switch the inference neural network to a new inference neural network according to the decrease in inference accuracy. Therefore, it may become possible to minimize the decrease in accuracy in the inference phase.

Furthermore, for example, whether the accuracy is decreasing may be determined according to at least one of a data value used in the inference or a likelihood related to the results of the inference during the inference execution period. With this, it may become possible to properly determine, according to the data value or the likelihood, whether the accuracy is decreasing. Therefore, it may become possible to properly switch the inference neural network to a new inference neural network according to the decrease in inference accuracy.

Furthermore, for example, when the data value is outside a first range, it may be determined that the accuracy is decreasing. With this, when the data value exceeds the range of the dynamic range or the like, it may become possible to properly determine that the accuracy is decreasing. Therefore, it may become possible to properly switch the inference neural network to a new inference neural network according to the decrease in inference accuracy.

Furthermore, for example, the data value may be predicted. Subsequently, when the predicted data value is outside a second range, it may be determined that the accuracy is decreasing. With this, when the predicted data value exceeds the range of the dynamic range or the like, it may become possible to properly determine that the accuracy is decreasing. Therefore, it may become possible to properly switch the inference neural network to a new inference neural network according to the decrease in inference accuracy.

Furthermore, for example, when the data value continuously remains within a third range throughout a first segment of the data, it may be determined that the accuracy is decreasing. With this, when the dynamic range is wide and the data value is continuously included in the range, it may become possible to properly determine that the accuracy is decreasing. Therefore, it may become possible to properly switch the inference neural network to a new inference neural network according to the decrease in inference accuracy.

Furthermore, for example, when the likelihood continuously remains lower than a reference throughout a second segment of the data, it may be determined that the accuracy is decreasing. With this, when the failure to obtain an appropriate likelihood continues, it may become possible to properly determine that the accuracy is decreasing. Therefore, it may become possible to properly switch the inference neural network to a new inference neural network according to the decrease in inference accuracy.

Furthermore, for example, the new inference neural network may be selected periodically during the inference execution period. Subsequently, the inference neural network may be switched to the new inference neural network. With this, it may become possible to periodically switch the inference neural network to a new inference neural network. Therefore, it may become possible to minimize the decrease in accuracy in the inference phase.

Furthermore, for example, an environment state may further be obtained from a measuring instrument (520) that measures the environment state in which the data is obtained by sensing. During the inference execution period, when the environment state changes, a new inference neural network may be selected. Subsequently, the inference neural network may be switched to the new inference neural network.

With this, it may become possible to switch the inference neural network to a new inference neural network according to a change in the environment state. Therefore, it may become possible to minimize the decrease in accuracy in the inference phase.

Furthermore, for example, a plurality of inference neural network candidates (341 to 343) may be generated from one training neural network.

With this, it may become possible to properly obtain the plurality of inference neural network candidates (341 to 343) from one training neural network that has been trained. Therefore, it may become possible to adaptively apply an inference neural network among the plurality of inference neural network candidates (341 to 343), and it may become possible to minimize the decrease in accuracy in the inference phase.

Furthermore, for example, a plurality of datasets may be obtained. Subsequently, the plurality of inference neural network candidates (341 to 343) that correspond respectively to the plurality of datasets may be generated from the one training neural network according to the plurality of datasets.

With this, it may become possible to properly generate a plurality of inference neural network candidates (341 to 343) according to the plurality of datasets. Therefore, it may become possible to adaptively apply an inference neural network among the plurality of inference neural network candidates (341 to 343) that have been properly generated, and it may become possible to minimize the decrease in accuracy in the inference phase.

Furthermore, a program according to one aspect of the present disclosure may cause at least one information processing circuit (450) to perform the inference execution method. With this, it may become possible to adaptively apply an inference neural network among the plurality of inference neural network candidates (341 to 343) according to the program. Therefore, the program may make it possible to minimize the decrease in accuracy in the inference phase.

Furthermore, an inference execution model according to one aspect of the present disclosure may be an inference execution model for at least one information processing circuit (450) to execute inference on data using an inference neural network. Furthermore, the inference execution model may include: a program; and one training neural network that has been trained or a plurality of inference neural network candidates (341 to 343) generated from the one training neural network. Here, the program may be for causing at least one information processing circuit (450) to perform the inference execution method.

With this, it may become possible to adaptively apply an inference neural network among the plurality of inference neural network candidates (341 to 343) according to the inference execution model. Therefore, the inference execution model may make it possible to minimize the decrease in accuracy in the inference phase.

Furthermore, for example, an inference execution device (400) according to one aspect of the present disclosure may execute inference on data using an inference neural network. Furthermore, the inference execution device (400) may include an information processing circuit (450) and memory (460). Moreover, a plurality of inference neural network candidates (341 to 343) generated from one training neural network that has been trained may be recorded on the memory (460).

Furthermore, the information processing circuit (450) may select an inference neural network from among the plurality of inference neural network candidates (341 to 343). Subsequently, the information processing circuit (450) may sequentially obtain data, sequentially execute inference on the sequentially obtained data using the inference neural network, and sequentially output the results of the sequentially executed inference.

Furthermore, the information processing circuit (450) may select a new inference neural network from among the plurality of inference neural network candidates (341 to 343) during an inference execution period. Subsequently, the information processing circuit (450) may switch the inference neural network to be used in the execution of the inference to a new inference neural network.

Thus, the inference execution device (400) may be able to adaptively apply an inference neural network among the plurality of inference neural network candidates (341 to 343) in the inference phase. Therefore, the inference execution device (400) may be able to minimize the decrease in accuracy in the inference phase.

Furthermore, for example, a data value used in the inference may be the value of intermediate data used midway through the inference. More specifically, the data value used in the inference may be the value of intermediate output data which is output from an intermediate layer of the inference neural network or an inference neural network candidate when the inference is executed using the inference neural network or the inference neural network candidate. The data value used in the inference may be expressed as an execution value. Furthermore, the data value used in the inference may be the minimum or maximum value of the intermediate data used in the inference.

Although the forms of the training execution device and the inference execution device are described thus far based on the embodiment, the forms of the training execution device and the inference execution device are not limited to those in the embodiment. The embodiment may be subject to variations conceived by a person having ordinary skill in the art, and two or more structural elements in the embodiment may be combined arbitrarily.

For example, processing that is performed by a specific structural element in the embodiment may be performed by a different structural element instead of the specific structural element. Moreover, the order of a plurality of processes may be changed, and a plurality of processes may be performed in parallel. The ordinal numbers, such as first and second, that are used in the description may be changed as appropriate. Furthermore, new ordinal numbers may be assigned to the structural elements or the like, and the ordinal numbers assigned to the structural elements or the like may be removed.

Furthermore, the training execution method or the inference execution method including steps to be performed by the training execution device and the inference execution device may be performed by an arbitrary device or system. For example, a computer (for example, an information processing circuit) including a processor, memory, an input/output circuit, etc., may perform part of or the entire training execution method or part of or the entire inference execution method. At this time, the training execution method or the inference execution method may be performed by the computer performing a program for causing the computer to perform the training execution method or the inference execution method.

Furthermore, the aforementioned program may be recorded on a non-transitory computer-readable recording medium. The program described herein may be replaced by an inference execution model including the program, a parameter, etc.

Each of the structural elements in the training execution device and the inference execution device may be configured from dedicated hardware, may be configured from general-purpose hardware that executes the aforementioned program, etc., or may be configured by combining the dedicated hardware and the general-purpose hardware. Furthermore, the general-purpose hardware may be configured from memory having the program recorded thereon and a general-purpose processor or the like that reads the program from the memory and executes the program. The memory may be semiconductor memory, hard disk, or the like, and the general-purpose processor may be a central processing unit (CPU) or the like.

Furthermore, the dedicated hardware may be configured from memory, a dedicated processor, etc. For example, the dedicated processor may perform the above-described training execution method or the above-described inference execution method with reference to the memory for recording data.

Furthermore, structural elements in the training execution device and the inference execution device may be electrical circuits. These electrical circuits may as a whole constitute one electrical circuit or may be separate electrical circuits. Moreover, these electrical circuits may correspond to the dedicated hardware or may correspond to the general-purpose hardware that executes the aforementioned program, etc.

Furthermore, the training execution device, the inference execution device, the training execution method, and the inference execution method can be simply expressed as a training device, an inference device, a training method, and an inference method, respectively. Each of the training execution device and the inference execution device may be configured of two or more devices arranged at dispersed locations. The inference execution method may include the training execution method that is performed by the training execution device. Moreover, a training and inference system including the training execution device and the inference execution device may perform a training and inference method including the training execution method and the inference execution method.

While an embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2020-058978 filed on Mar. 27, 2020.

INDUSTRIAL APPLICABILITY

The present disclosure can be used in an inference execution method in which inference is executed on data using an inference neural network; the present disclosure is applicable to a sensing system that senses an object and an identification system that identifies an object, for example.

The invention claimed is:

1. An inference execution method for at least one information processing circuit to execute inference on data using an inference neural network, the inference execution method comprising:
    training, by a first computing device, a single neural network to generate a single trained neural network;
    generating, based on the single trained neural network and by applying differing sets of parameters, a plurality of inference neural network candidates, wherein the differing sets of parameters correspond to differing environment states, and wherein each of the plurality of inference neural network candidates utilize smaller data bits than the single trained neural network for execution via a second computing device that is lower in performance than the first device;
    selecting, among the plurality of inference neural network candidates, a first inference neural network candidate for execution by the second device;
    sequentially obtaining image data to be processed by the first inference neural network candidate;
    sequentially executing, on the image data sequentially obtained, the inference using the first inference neural network candidate for detection of objects within the image data;
    sequentially outputting results of the inference sequentially executed, wherein the outputted results include successful and/or failed detection of the objects within the image data; and
    based on an inference accuracy level of the outputted results of the first inference neural network candidate, selecting a second inference neural network candidate from among the plurality of inference neural network candidates, and switching the first inference neural network candidate to be used in the execution of the inference with the second inference neural network candidate; and
    adaptably applying, by the second computing device, the second inference neural network candidate during performance of the inference, when the second inference neural network candidate provides a more successful detection of the objects within the image data.

2. The inference execution method according to claim 1, wherein
    the plurality of inference neural network candidates have different dynamic ranges and different levels of resolution.

3. The inference execution method according to claim 1, wherein
    the plurality of inference neural network candidates correspond respectively to a plurality of environment state candidates that correspond to the differing environment states in which the image data is obtained by sensing.

4. The inference execution method according to claim 3, wherein
    the environment state includes an attribute related to a location, an illuminance level, or a time slot.

5. The inference execution method according to claim 1, wherein
    each of one or more inference neural network candidates among the plurality of inference neural network candidates is evaluated using the image data, and the second inference neural network is selected from among the one or more inference neural network candidates according to an evaluation result.

6. The inference execution method according to claim 1, wherein
a neural network having highest resolution among one or more inference neural network candidates is selected from among the plurality of inference neural network candidates as the second inference neural network, the one or more inference neural network candidates each having a dynamic range including a data value used in the inference.

7. The inference execution method according to claim 3, further comprising:
obtaining an environment state from a measuring instrument that measures the environment state, wherein
a neural network corresponding to the environment state is selected as the second inference neural network according to the environment state from among the plurality of inference neural network candidates that correspond respectively to the differing environment states.

8. The inference execution method according to claim 1, wherein
whether accuracy of the inference is decreasing is determined, and when the accuracy is determined to be decreasing, the second inference neural network is selected, and the first inference neural network is switched to the second inference neural network.

9. The inference execution method according to claim 8, wherein
whether the accuracy is decreasing is determined according to at least one of a data value used in the inference or a likelihood related to the results of the inference.

10. The inference execution method according to claim 9, wherein
when the data value is outside a first range, the accuracy is determined to be decreasing.

11. The inference execution method according to claim 9, further comprising:
determining that the accuracy is decreasing when the data value used in the inference is outside a second range.

12. The inference execution method according to claim 9, wherein
when the data value continuously remains within a third range throughout a first segment of the image data, the accuracy is determined to be decreasing.

13. The inference execution method according to claim 9, wherein
when the likelihood continuously remains lower than a reference throughout a second segment of the image data, the accuracy is determined to be decreasing.

14. The inference execution method according to claim 1, wherein
periodically, the second inference neural network is selected, and the first inference neural network is switched to the second inference neural network.

15. The inference execution method according to claim 1, further comprising:
obtaining an environment state in which the image data is obtained by sensing from a measuring instrument that measures the environment state, wherein
when the environment state changes, the second inference neural network is selected, and the first inference neural network is switched to the second inference neural network.

16. The inference execution method according to claim 1, further comprising:
obtaining a plurality of datasets, wherein
the plurality of inference neural network candidates that correspond respectively to the plurality of datasets are generated from the single trained neural network according to the plurality of datasets.

17. A non-transitory computer-readable recording medium having a program recorded thereon for causing at least one information processing circuit to perform an inference execution method for the at least one information processing circuit to execute inference on data using an inference neural network, the inference execution method including:
training, by a first computing device, a single neural network to generate a single trained neural network;
generating, based on the single trained neural network and by applying differing sets of parameters, a plurality of inference neural network candidates, wherein the differing sets of parameters correspond to differing environment states, and wherein each of the plurality of inference neural network candidates utilize smaller data bits than the single trained neural network for execution via a second computing device that is lower in performance than the first device;
selecting, among the plurality of inference neural network candidates, a first inference neural network candidate for execution by the second device;
sequentially obtaining image data to be processed by the first inference neural network candidate;
sequentially executing, on the image data sequentially obtained, the inference using the first inference neural network candidate for detection of objects within the image data;
sequentially outputting results of the inference sequentially executed, wherein the outputted results include successful and/or failed detection of the objects within the image data; and
based on an inference accuracy level of the outputted results of the first inference neural network candidate, selecting a second inference neural network candidate from among the plurality of inference neural network candidates, and switching the first inference neural network candidate to be used in the execution of the inference with the second inference neural network candidate; and
adaptably applying, by the second computing device, the second inference neural network candidate during performance of the inference, when the second inference neural network candidate provides a more successful detection of the objects within the image data.

18. A non-transitory computer-readable recording medium having recorded thereon an inference execution model including a program for causing at least one information processing circuit to perform an inference execution method for the at least one information processing circuit to execute inference on data using an inference neural network, the inference execution method including:
training, by a first computing device, a single neural network to generate a single trained neural network;
generating, based on the single trained neural network and by applying differing sets of parameters, a plurality of inference neural network candidates, wherein the differing sets of parameters correspond to differing environment states, and wherein each of the plurality of inference neural network candidates utilize smaller data bits than the single trained neural network for execution via a second computing device that is lower in performance than the first device;

selecting, among the plurality of inference neural network candidates, a first inference neural network candidate for execution by the second device;
sequentially obtaining image data to be processed by the first inference neural network candidate;
sequentially executing, on the image data sequentially obtained, the inference using the first inference neural network candidate for detection of objects within the image data;
sequentially outputting results of the inference sequentially executed, wherein the outputted results include successful and/or failed detection of the objects within the image data;
based on an inference accuracy level of the outputted results of the first inference neural network candidate, selecting a second inference neural network candidate from among the plurality of inference neural network candidates, and switching the first inference neural network candidate to be used in the execution of the inference with the second inference neural network candidate, wherein
the inference execution model further includes the single trained neural network that has been trained or the plurality of inference neural network candidates generated from the single trained neural network; and
adaptably applying, by the second computing device, the second inference neural network candidate during performance of the inference, when the second inference neural network candidate provides a more successful detection of the objects within the image data.

* * * * *